US012776151B2

(12) United States Patent
Park et al.

(10) Patent No.: US 12,776,151 B2
(45) Date of Patent: Oct. 27, 2026

(54) ELECTRONIC DEVICE OF VEHICLE FOR RECORDING OPERATION INTENSITY OF PEDAL BASED ON IMAGE AND OPERATING METHOD OF THE SAME

(71) Applicant: THINKWARE CORPORATION, Seongnam-si (KR)

(72) Inventors: Soon Woo Park, Seongnam-si (KR); Kang Sik Kim, Seongnam-si (KR)

(73) Assignee: THINKWARE CORPORATION, Seongnam-si (KR)

(*) Notice: Subject to any disclaimer, the term of this patent is extended or adjusted under 35 U.S.C. 154(b) by 28 days.

(21) Appl. No.: 18/946,020

(22) Filed: Nov. 13, 2024

(65) Prior Publication Data

US 2025/0157228 A1 May 15, 2025

(30) Foreign Application Priority Data

Nov. 14, 2023 (KR) ........................ 10-2023-0157752
Nov. 11, 2024 (KR) ........................ 10-2024-0158861

(51) Int. Cl.
*G06V 20/59* (2022.01)
*B60W 40/08* (2012.01)
*G06T 7/70* (2017.01)

(52) U.S. Cl.
CPC ............. *G06V 20/59* (2022.01); *B60W 40/08* (2013.01); *G06T 7/70* (2017.01); *B60W 2540/10* (2013.01); *B60W 2540/12* (2013.01)

(58) Field of Classification Search
CPC .. G06V 20/59; B60W 40/08; B60W 2540/10; B60W 2540/12; G06T 7/70
USPC ........................................................... 701/70
See application file for complete search history.

(56) References Cited

FOREIGN PATENT DOCUMENTS

| | | | | |
|---|---|---|---|---|
| CN | 101545759 A | * | 9/2009 | .............. B60T 7/042 |
| CN | 102269656 A | * | 12/2011 | .............. B60T 7/042 |
| CN | 103481876 B | * | 4/2018 | .............. B60T 7/042 |
| EP | 4245618 A1 | * | 9/2023 | .............. B60T 7/042 |
| WO | WO-2023174026 A1 | * | 9/2023 | ........... G07C 5/0891 |

* cited by examiner

*Primary Examiner* — Hai H Huynh
(74) *Attorney, Agent, or Firm* — ZION IP; Byungwoong Park

(57) ABSTRACT

The present disclosure provides an electronic device of a vehicle for recording the pedal operation intensity based on a video and an operating method of the same. In the present disclosure, the electronic device is configured to analyze a video for pedal and detect a location of the pedal, to determine the operation intensity of the pedal based on the location, and to store the operation intensity. The electronic device may store a database in which different locations of the pedal and different operation intensities of the pedal are mapped to each other, respectively, and may determine the operation intensity mapped to the location using the database. The camera device may be fixed adjacent to the pedal and may capture a video for the pedal, and may transmit the same to the electronic device. The pedal may include at least one of a brake pedal and an accelerator pedal.

13 Claims, 13 Drawing Sheets

ELECTRONIC DEVICE OF VEHICLE FOR RECORDING OPERATION INTENSITY OF PEDAL BASED ON IMAGE AND OPERATING METHOD OF THE SAME

CROSS-REFERENCE TO RELATED APPLICATION(S)

This application claims the priority benefit under 35 U.S.C. § 119 to Korean Patent Application No. 10-2023-0157752, filed on Nov. 14, 2023, and Korean Patent Application No. 10-2024-0158861, filed on Nov. 11, 2024, in the Korean Intellectual Property Office, the entire contents of which are incorporated herein by reference in their entirety.

BACKGROUND

1. Field

The present disclosure relates to an electronic device of a vehicle for recording the pedal operation intensity based on a video and an operating method of the same.

2. Description of Related Art

Typically, an event data recorder (EDR) is installed in a vehicle. The event data recorder records a situation before and after collision of the vehicle for 15 different items. Some of the items relate to the operation of an accelerator pedal and a brake pedal. In detail, the event data recorder records the operation intensity of the accelerator pedal and whether the brake pedal is operated.

However, when an accident suspected of sudden acceleration of the vehicle occurred, it is difficult to provide whether a driver of the vehicle operated the brake pedal. The event data recorder records only whether the brake pedal has been operated. Therefore, if the driver relatively lightly operates the brake pedal, the event data recorder records that the brake pedal has not been operated. Therefore, the manufacturer of the vehicle avoids responsibility for the accident, claiming that the driver did not operate the brake pedal or did not operate it sufficiently.

SUMMARY

The present disclosure provides an electronic device of a vehicle for recording the pedal operation intensity based on a video.

In the present disclosure, an operating method of an electronic device mounted to a vehicle may include analyzing a video for a pedal and detecting a location of the pedal; determining the operation intensity of the pedal based on the location; and storing the operation intensity.

In the present disclosure, an electronic device mounted to a vehicle may include a memory; and a processor configured to connect to the memory and to execute at least one instruction stored in the memory, and the processor may be configured to analyze a video for a pedal and detect a location of the pedal, to determine the operation intensity of the pedal based on the location, and to store the operation intensity in the memory.

In the present disclosure, a video processing system mounted to a vehicle may include a camera device fixed adjacent to a pedal and configured to capture a video for the pedal, and an electronic device configured to analyze the video, to detect a location of the pedal, to determine the operation intensity of the pedal based on the location, and to store the operation intensity.

In the present disclosure, an operating method of a video processing system mounted to a vehicle may include capturing, by a camera device fixed adjacent to a pedal, and capturing a video for the pedal; analyzing, by an electronic device, the video and detecting a location of the pedal; determining, by the electronic device, the operation intensity of the pedal based on the location; and storing, by the electronic device, the operation intensity.

According to the present disclosure, an electronic device may record the operation intensity of a pedal based on a video for the pedal. Here, the electronic device may record at least one of the operation intensity of a brake pedal and the operation intensity of an accelerator pedal. This may be used as data to prove not only an operation status of the pedal but also the operation intensity of the pedal. Therefore, in a situation in which it is difficult to determine the cause, such as an accident suspected of sudden acceleration of a vehicle, it is possible to relatively accurately determine whether a driver was at fault. Here, when an electronic device records the operation intensity, encryption may make it possible to improve the reliability for the operation intensity and to prevent indiscriminate sharing.

DETAILED DESCRIPTION

Hereinafter, various example embodiments of the present document are described with reference to the accompanying drawings.

Figure 1:
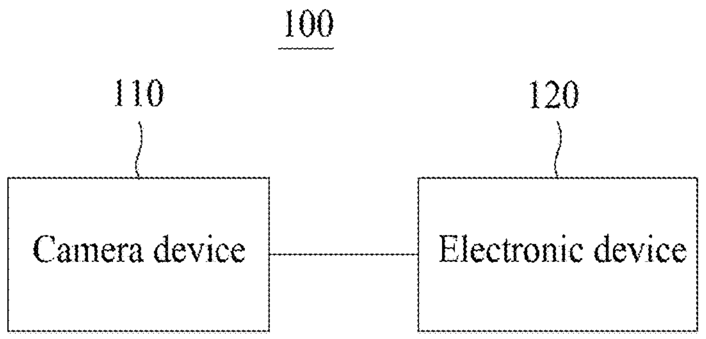
FIG. 1 is a block diagram illustrating a configuration of a video processing system according to various example embodiments.

FIG. 1 is a block diagram illustrating a configuration of a video processing system 100 according to various example embodiments.

Referring to FIG. 1, the video processing system 100 may include a camera device 110 and an electronic device 120. The video processing system 100 may be mounted to a vehicle. In some example embodiments, at least one another component may be added to the video processing system 100.

The camera device 110 may capture a video for a pedal of the vehicle. To this end, the camera device 110 may be fixed adjacent to the pedal in the vehicle. Here, the pedal may include at least one of a brake pedal and an accelerator pedal. According to an example embodiment, the camera device 110 may be installed in front of at least one of the brake pedal and the accelerator pedal. In this case, the camera device 110 may capture a video for the front surface of at least one of the brake pedal and the accelerator pedal. According to another example embodiment, the camera device 110 may be installed on one side of the brake pedal. In this case, the camera device 110 may capture a video of one side surface of the brake pedal. According to still example embodiment, the camera device 110 may be installed on one side of the accelerator pedal. In this case, the camera device 110 may capture a video of one side surface of the accelerator pedal.

In some example embodiments, the camera device 110 may include at least one of one or more lenses, an image sensor, a flash, and an image signal processor (ISP). For example, some of the lenses may have the same lens property (e.g., angle of view, focal distance, autofocus, f number, or optical zoom). The lenses may include a light source lens or a telephoto lens. For example, the image sensor may convert light emitted or reflected from a subject and transmitted through the one or more lenses to an electrical signal, and may acquire an image corresponding to the subject. For example, the image sensors may include, for example, a single image sensor selected from among image sensors with different properties such as a red-green-blue (RGB) sensor, a black and white (BW) sensor, an IF sensor, or a ultraviolet (UV) sensor, a plurality of image sensors with the same property, or a plurality of image sensors with different properties. Each image sensor may be implemented using, for example, a charged coupled device (CCD) sensor or a complementary metal oxide semiconductor (CMOS) sensor. For example, the flash may include one or more light emitting diodes (e.g., RGB LED, white LED, infrared LED, or ultraviolet LED), or a xenon lamp.

The electronic device 120 may record the operation intensity of the pedal based on the video acquired by the camera device 110. Here, the electronic device 120 may periodically record the operation intensity of the pedal. In detail, the electronic device 120 may analyze the video, may detect a location of the pedal, and may record the operation intensity of the pedal corresponding to the location of the pedal. Since the camera device 110 is fixed adjacent to the pedal, the location of the pedal may be variable according to the operation intensity of the pedal by a driver. Here, the location of the pedal may represent displacement from an initial location, that is, a location of the pedal when not operated. The electronic device 120 may record the operation intensity of at least one of the brake pedal and the accelerator pedal. According to an example embodiment, when the camera device 110 is installed in front of at least one of the brake pedal and the accelerator pedal, the electronic device 120 may record at least one of the operation intensity of the brake pedal and the operation intensity of the accelerator pedal from a location on the front surface of at least one of the brake pedal and the accelerator pedal. According to another example embodiment, when the camera device 110 is installed on one side of the brake pedal, the electronic device 120 may record the operation intensity of the brake pedal from a location on one side surface of the brake pedal. According to still example embodiment, when the camera device 110 is installed on one side of the accelerator pedal, the electronic device 120 may record the operation intensity of the accelerator pedal from a location on one side surface of the accelerator pedal.

The camera device 110 and the electronic device 120 may be communicatively connected in a wired or wireless manner. In some example embodiments, the camera device 110 and the electronic device 120 may be connected through a communication cable. In an example embodiment, the camera device 110 and the electronic device 120 may perform communication using an analog method. For example, the analog method may include analogue high definition (AHD). In another example embodiment, the camera device 110 and the electronic device 120 may perform communication using a digital method. For example, the digital method may include a serial transmission method. In this case, the camera device 110 may include a serializer, and the electronic device 120 may include a deserializer. However, without being limited thereto, the camera device 110 and the electronic device 120 may also be connected through internal network communication (e.g., controller area network (CAN) communication) of the vehicle. The camera device 110 and the electronic device 120 may include various communication chips.

Figure 2:
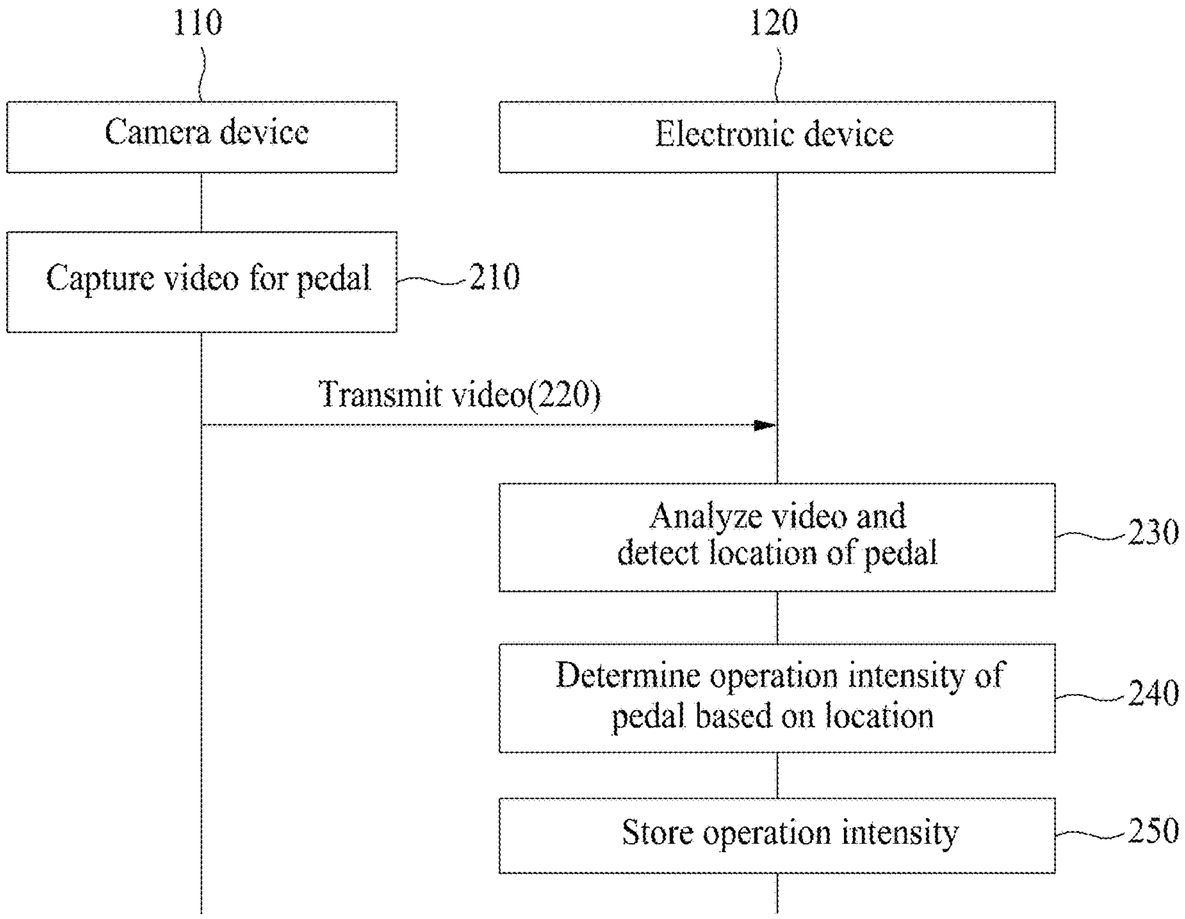
FIG. 2 is a flowchart illustrating an operating method of a video processing system for recording the operation intensity of a pedal according to various example embodiments.
Figure 3A:
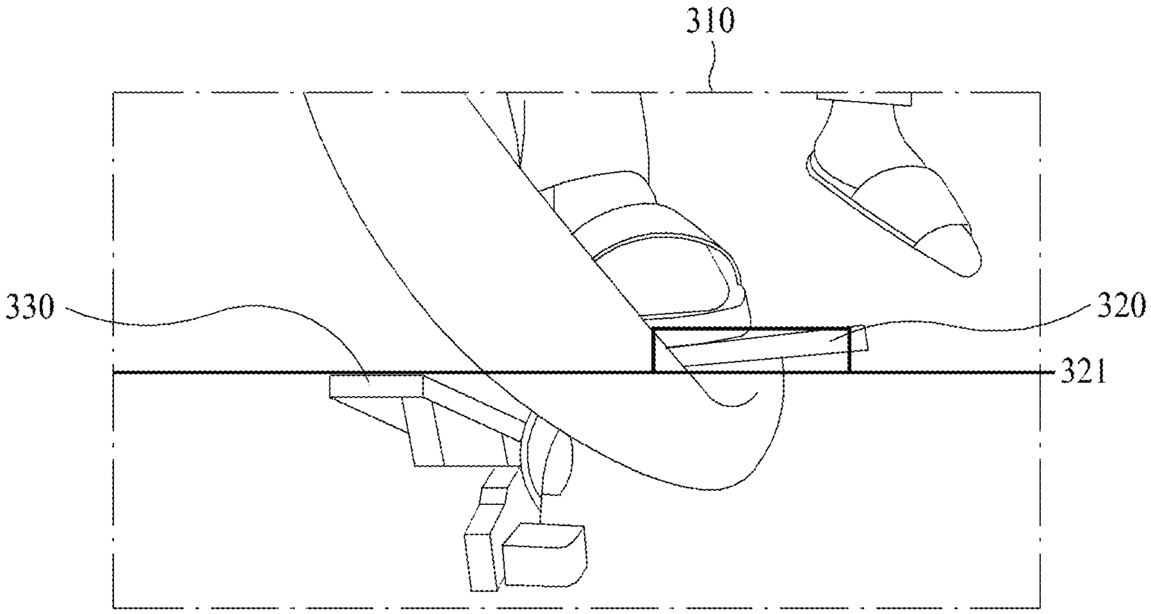
FIGS. 3A and 3B illustrate examples for describing operation characteristics of an electronic device for detecting a location of a pedal according to an example embodiment.
Figure 3B:
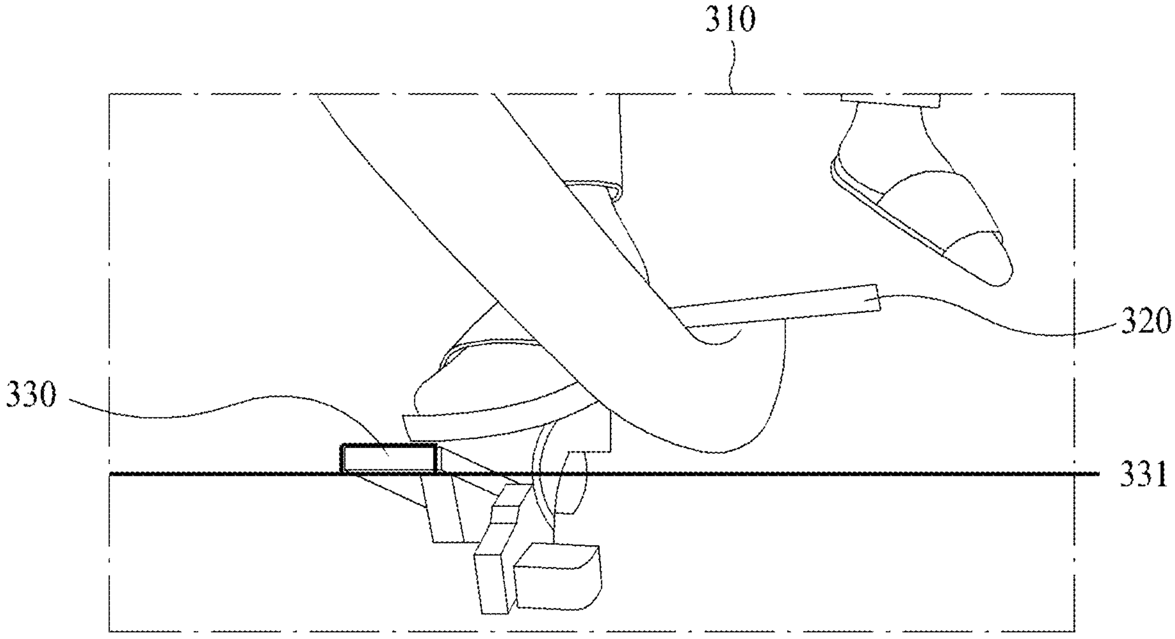
Figure 4:
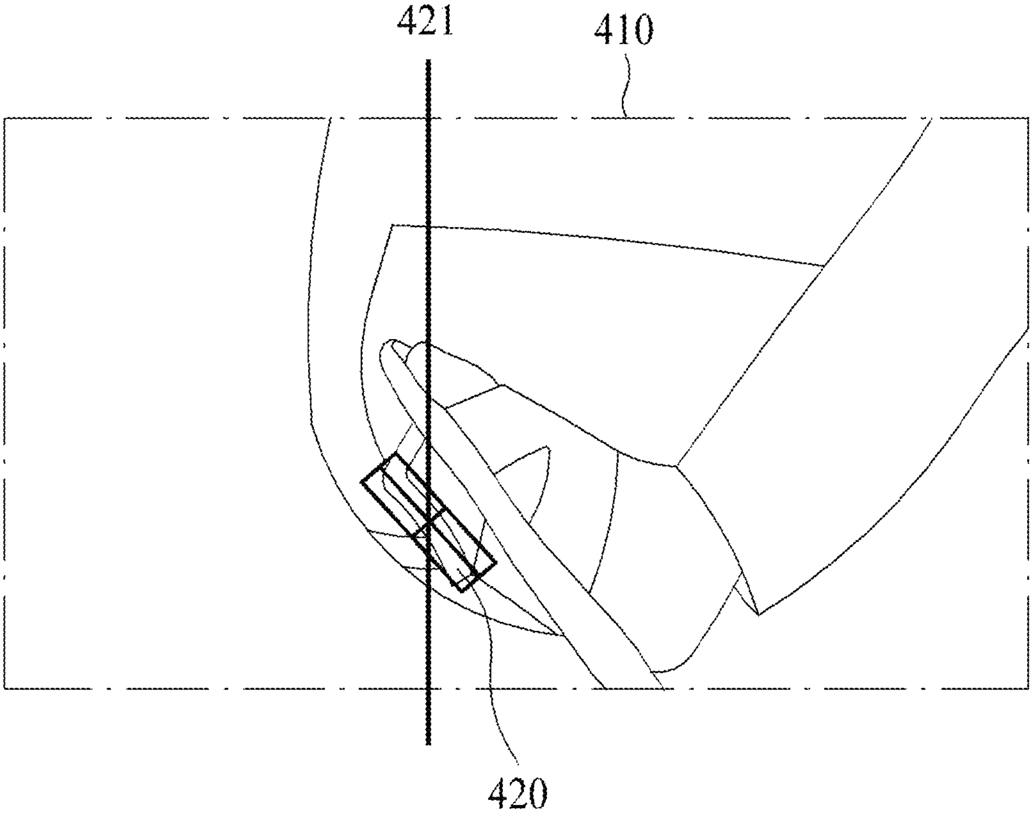
FIG. 4 illustrates an example for describing operation characteristics of an electronic device for detecting a location of a pedal according to another example embodiment.

FIG. 2 is a flowchart illustrating an operating method of the video processing system 100 for recording the operating intensity of a pedal 320, 330, 420 according to various example embodiments. FIGS. 3A and 3B illustrate examples for describing operation characteristics of the electronic device 120 for detecting a location of the pedal 320, 330 according to an example embodiment. FIG. 4 illustrates an example for describing operation characteristics of the electronic device 120 for detecting a location of the pedal 420 according to another example embodiment.

Referring to FIG. 2, in operation 210, the camera device 110 may capture the video 310, 410 for the pedal 320, 330, 420. To this end, the camera device 110 may be fixed to the vehicle adjacent to the pedal 320, 330, 420. Here, the pedal 320, 330, 420 may include at least one of the brake pedal 320, 420 and the accelerator pedal 330. According to an example embodiment, the camera device 110 may be installed in front of at least one of the brake pedal 320 and the accelerator pedal 330. In this case, as shown in FIGS. 3A and 3B, the camera device 110 may capture a video 310 for the front surface of at least one of the brake pedal 320 and the accelerator pedal 330. According to another example embodiment, the camera device 110 may be installed on one side of the brake pedal 420. In this case, as shown in FIG. 4, the camera device 110 may capture the video 410 for one side surface of the brake pedal 420. According to still example embodiment, although not illustrated, the camera device 110 may be installed on one side of the accelerator pedal. In this case, the camera device 110 may capture a video for one side surface of the accelerator pedal. Then, in operation 220, the camera device 110 may transmit the video 310, 410 to the electronic device 120. Therefore, the electronic device 120 may acquire the video 310, 410 from the camera device 110.

Then, in operation 230, the electronic device 120 may analyze the video 310, 410 and may detect a location of the pedal 320, 330, 420. In detail, the electronic device 120 may recognize a reference axis 321, 331, 421 preset for the pedal 320, 330, 420 within the video 310, 410 and then, detect a location of the reference axis 321, 331, 421. Here, the reference axis 321, 331, 421 may include at least one of a horizontal axis and a vertical axis. Here, the electronic device 120 may detect a location of at least one of the brake pedal 320, 420 and the accelerator pedal 330.

According to an example embodiment, when the camera device 110 is installed in front of at least one of the brake pedal 320 and the accelerator pedal 330, the electronic device 120 may detect a location of the front surface of at least one of the brake pedal 320 and the accelerator pedal 330 in the video 310 as shown in FIGS. 3A and 3B. Here, as illustrated, the reference axis 321, 331 may be the horizontal axis, but without being limited thereto, may be, for example, the vertical axis or the combination of the horizontal axis and the vertical axis. In more detail, when the camera device 110 is installed in front of the brake pedal 320 or both the brake pedal 320 and the accelerator pedal 330, the electronic device 120 may recognize the reference axis 321 on the front surface of the brake pedal 320 and then detect a location of the reference axis 321 as shown in FIG. 3A. Meanwhile, when the camera device 110 is installed in front of the accelerator pedal 330 or both the brake pedal 320 and the accelerator pedal 330, the electronic device 120 may recognize the reference axis 331 on the front surface of the accelerator pedal 330 and then detect a location of the reference axis 331 as shown in FIG. 3B. Here, as illustrated, the electronic device 120 may recognize the reference axis 321, 331 for the lower side of the front surface, but without being limited thereto, for example, may recognize the reference axis 321, 331 for the center of the front surface or the upper side of the front surface.

According to another example embodiment, when the camera device 110 is installed on one side of the brake pedal 420, the electronic device 120 may detect a location of one side surface of the brake pedal 420 in the video 410 as shown in FIG. 4. Here, the reference axis 421 may be the vertical axis, but without being limited thereto, may be for example, the horizontal axis or the combination of the horizontal axis and the vertical axis. In more detail, as illustrated, the electronic device 120 may recognize the reference axis 421 on the side surface of the brake pedal 420 and then detect a location of the reference axis 421. Here, as illustrated, the electronic device 120 may recognize the reference axis 421 for the center of the side surface, but without being thereto, for example, may recognize the reference axis 421 for a single point of the inner side (facing the driver) of the side surface or the outer side (on the other side of the inner side) of the side surface.

According to still example embodiment, when the camera device 110 is installed on one side of an accelerator pedal, the electronic device 120 may detect a location of one side surface of the accelerator pedal in a video although not illustrated. Here, a reference axis may be the vertical axis, the horizontal axis, or the combination of the horizontal axis and the vertical axis. In more detail, although not illustrated, the electronic device 120 may recognize the reference axis on one side surface of the accelerator pedal and then, detect a location of the reference axis. Here, the electronic device 120 may recognize the reference axis for the center of the side surface or a single point of the inner side (facing the driver) of the side surface or the outer side (on the other side of the inner side) of the side surface.

Then, in operation 240, the electronic device 120 may determine the operation intensity of the pedal 320, 330, 420 based on the location. Here, the electronic device 120 may store a database in which different locations of the pedal 320, 330, 420 and different operation intensities of the pedal 320, 330, 420 are mapped to each other, respectively. Using the database, the electronic device 120 may determine the operation intensity that is mapped to the location. In detail, in the database, a plurality of locations and a plurality of operation intensities may be defined in equal numbers and mapped to each other, respectively. The locations may be defined by dividing the location range from a location of the pedal 320, 330, 420 when not operated to a location of the pedal 320, 330, 420 when fully operated into predetermined intervals by a predetermined number. The operation intensities may be defined by dividing the operation intensity range determined for the pedal 320, 330, 420 into predetermined intervals by the number of locations. According to an example embodiment, the database may be constructed in cooperation with the driver when mounting the video processing system 100 or the electronic device 120 to the vehicle or when initializing the video processing system 100 or the electronic device 120 in the vehicle. According to another example embodiment, the database may be collectively generated for the vehicle model by the manufacturer of the vehicle or the electronic device 120 and then, stored in the electronic device 120.

Then, in operation 250, the electronic device 120 may store the operation intensity. In detail, the electronic device 120 may store the operation intensity while storing the video 310, 410. Here, the electronic device 120 may store the operation intensity in correspondence to a point in time at which the video 310, 410 is captured. According to an example embodiment, the electronic device 120 may store the operation intensity in a file in which the video 310, 410 is recorded. According to another example embodiment, the electronic device 120 may store the operation intensity in a file separate from the video 310, 410. Here, the operation intensity may be displayed only through a predetermined viewer program. The electronic device 120 may encrypt the operation intensity using a preset encryption key and then store the same. Therefore, the operation intensity may be decrypted using the encryption key and then displayed.

Figure 5:
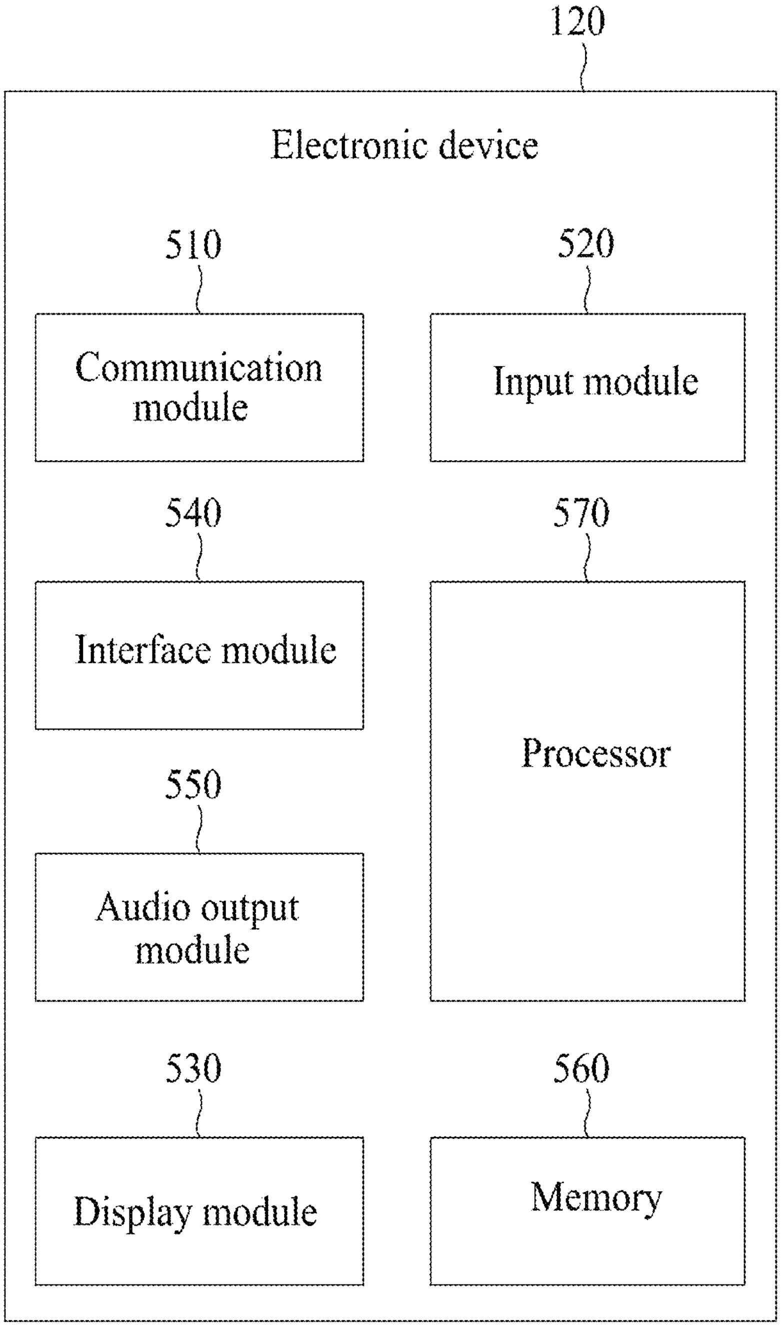
FIG. 5 is a block diagram illustrating a configuration of an electronic device according to various example embodiments.

FIG. 5 is a block diagram illustrating a configuration of the electronic device 120 according to various example embodiments.

Referring to FIG. 5, the electronic device 120 may be mounted to the vehicle with the camera device 110 and may be communicatively connected to the camera device 110. In detail, the electronic device 100 may include at least one of a communication module 510, an input module 520, a display module 530, an interface module 540, an audio output module 550, a memory 560, and a processor 570. In some example embodiments, at least one of components (e.g., communication module, display module, audio output module) of the electronic device 120 may be omitted and at least one another component (e.g., at least one sensor) may be added. In some example embodiments, at least two of the components of the electronic device 120 may be implemented into a single integrated circuit. In an example embodiment, the components of the electronic device 120 may be integrally configured as a single unit. In this case, the components of the electronic device 120 may be accommodated in a single housing. In another example embodiment, the components of the electronic device 120 may be configured through distribution into at least two units.

The communication module 510 may perform communication between the electronic device 120 and an external device. The communication module 510 may establish a communication channel with the external device and may communicate with the external device through the communication channel. Here, the external device may include at least one of a satellite, a base station, a server, and another electronic device (e.g., used by the driver). The communication module 510 may include at least one of a wired communication module and a wireless communication module. The wired communication module may be connected to the external device in a wired manner and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, wireless fidelity (WiFi) direct, near field communication (NFC), and infrared data association (IrDA). The far field communication module may communicate with the external device using a far field communication scheme. Here, the far field communication module may communicate with the external device over a network. For example, the network may include at least one of a cellular network, the Internet, and a computer network such as a local area network (LAN) and a wide area network (WAN).

The input module 520 may input a signal to be used for at least one component of the electronic device 120. The input module 520 may include, for example, at least one of at least one of a button (also, referrable to as key), a keyboard, a keypad, a mouse, a joystick, and a microphone. Here, the button may include at least one of a physical button and a touch button. In some example embodiments, the input module 620 may include at least one of a touch circuitry set to detect a touch and a sensor circuitry set to measure strength of force generated by the touch.

The display module 530 may visually output information to the outside of the electronic device 120. For example, the display module 530 may include at least one of a display, a hologram device, and a projector. In some example embodiments, the display module 530 may be implemented as a touchscreen by being combined with at least one of the touch circuitry and the sensor circuitry of the input module 520.

The interface module 540 may be provided for interfacing between the electronic device 120 and the external device. In detail, the interface module 540 may support a designated protocol that may be connected to the external device in a wired or wireless manner. Here, the external device may include at least one of the vehicle and the camera device 110. In an example embodiment, in the case of communicating with the camera device 110 using an analog method, the interface module 540 may receive a video from the camera device 110 and may convert the video from an analog signal to digital data. In another example embodiment, in the case of communicating with the camera device 110 using a digital method, the interface module 540 may receive the video from serial data to parallel data. In this case, the interface module 540 may be implemented as a deserializer.

The audio output module 550 may output an audio signal to the outside of the electronic device 120. For example, the audio output module 550 may include at least one of a speaker and a receiver. In an example embodiment, the audio output module 550 may include at least one voice coil that provides vibration to a diaphragm within the speaker and a magnet capable of forming a magnetic field. When current flows in the voice coil, the magnetic field formed in the voice coil may vibrate the voice coil through interaction with the magnetic field formed by the magnet. The diaphragm connected to the voice coil may vibrate based on vibration of the voice coil. The speaker may output the audio signal based on the vibration of the diaphragm.

The memory 560 may store a variety of data used by at least one component of the electronic device 120. For example, the memory 560 may include at least one of a volatile memory and a non-volatile memory. Data may include at least one program and input data or output data related thereto. The program may be stored in the memory 560 as software including at least one instruction, and, for example, may include at least one of an operating system (OS), middleware, and an application. The memory 560 may include at least one of a first memory embedded in the electronic device 120 and a second memory detachably provided to the electronic device 120.

According to various example embodiments, the memory 560 may store a program for recording the operation intensity of the pedal 320, 330, 420 based on the video 310, 410. According to various example embodiments, the memory 560 may store a database in which different locations of the pedal 320, 330, 420 and operation intensities of the pedal 320, 330, 420 are mapped to each other, respectively. In detail, in the database, a plurality of locations and a plurality of operation intensities may be defined in equal numbers and mapped to each other, respectively. The locations may be defined by dividing the location range from a location of the pedal 320, 330, 420 when not operated to a location of the pedal 320, 330, 420 when fully operated into predetermined intervals by a predetermined number. The operation intensities may be defined by dividing the operation intensity range from the minimum intensity to the maximum intensity determined for the pedal 320, 330, 420 into predetermined intervals by the number of locations. According to some example embodiments, in the database, a video of the pedal 320, 330, 420 when not operated and a video of the pedal 320, 330, 420 when fully operated may be further stored.

According to an example embodiment, when the camera device 110 is installed in front of at least one of the brake pedal 320 and the accelerator pedal 330, different locations and different operation intensities may be mapped to each other respectively, in the database for each of the brake pedal 320 and the accelerator pedal 330 as shown in [Table 1] below. According to another example embodiment, when the camera device 110 is installed on one side of the brake pedal 420, different locations and different operation intensities may be mapped to each other, respectively, in the database for the brake pedal 420 as shown in [Table 2] below.

TABLE 1

| Location of brake pedal 320 | Operation intensity of brake pedal 320 | Location of accelerator pedal 330 | Operation intensity of accelerator pedal 330 |
|---|---|---|---|
| Location when not operated | Minimum intensity | Location when not operated | Minimum intensity |
| — | — | — | — |
| — | — | — | — |
| — | — | — | — |

TABLE 1-continued

| Location of brake pedal 320 | Operation intensity of brake pedal 320 | Location of accelerator pedal 330 | Operation intensity of accelerator pedal 330 |
|---|---|---|---|
| Location when fully operated | Maximum intensity | Location when fully operated | Maximum intensity |

TABLE 2

| Location of brake pedal 420 | Operation intensity of brake pedal 420 |
|---|---|
| Location when not operated | Minimum intensity |
| — | — |
| — | — |
| — | — |
| Location when fully operated | Maximum intensity |

The processor 570 may control at least one component of the electronic device 120. Through this, the processor 570 may perform data processing or operation. For example, hardware for processing data may include an arithmetic and logic unit (ALU), a floating point unit (FPU), a field programmable gate array (FPGA), a central processing unit (CPU), and/or an application processor (AP). The processor 570 may have a structure of a single-core processor or may have a structure of a multi-core processor, such as dual core, quad core, hexa core, and octa core. According to various example embodiments, the processor 570 may execute an instruction stored in the memory 560.

According to various example embodiments, the processor 570 may record the operation intensity of the pedal 320, 330, 420 based on the video 310, 410 for the pedal 320, 330, 420 acquired by the camera device 110. Here, the processor 570 may periodically record the operation intensity of the pedal 320, 330, 420. In detail, the processor 570 may analyze the video 310, 410, may detect the location of the pedal 320, 330, 420, and may record the operation intensity of the pedal 320, 330, 420 corresponding to the location of the pedal 320, 330, 420. Since the camera device 110 is fixed adjacent to the pedal 320, 330, 420, the location of the pedal 320, 330, 420 within the video 310, 410 may vary depending on the operation intensity of the pedal 320, 330, 420. Here, using the prestored database, the processor 570 may determine the operation intensity of the pedal 320, 330, 420 that is mapped to the location of the pedal 320, 330, 420. Here, the location of the pedal 320, 330, 420 may represent an initial location, that is, displacement from the location of the pedal 320, 330, 420 when not operated. The processor 570 may record the operation intensity of at least one of the brake pedal 320, 420 and the accelerator pedal 330.

According to various example embodiments, the processor 570 may pre-store a database in the memory 560. According to an example embodiment, the processor 570 may directly construct the database and may store the same in the memory 560. When mounting the video processing system 100 or the electronic device 120 to the vehicle, or when initializing the video processing system 100 or the electronic device 120 in the vehicle, the processor 570 may construct the database in cooperation with the driver. According to another example embodiment, the processor 570 may download the database from an external device, for example, a server and may store the same in the memory 560. In this case, the database may be collectively generated for the vehicle model by the manufacturer of the vehicle or the electronic device 120 and provided. For example, the manufacturer may construct databases for different vehicle models, respectively, and may provide the same database to the electronic devices 120 mounted to vehicles corresponding to a specific vehicle model.

Figure 6:
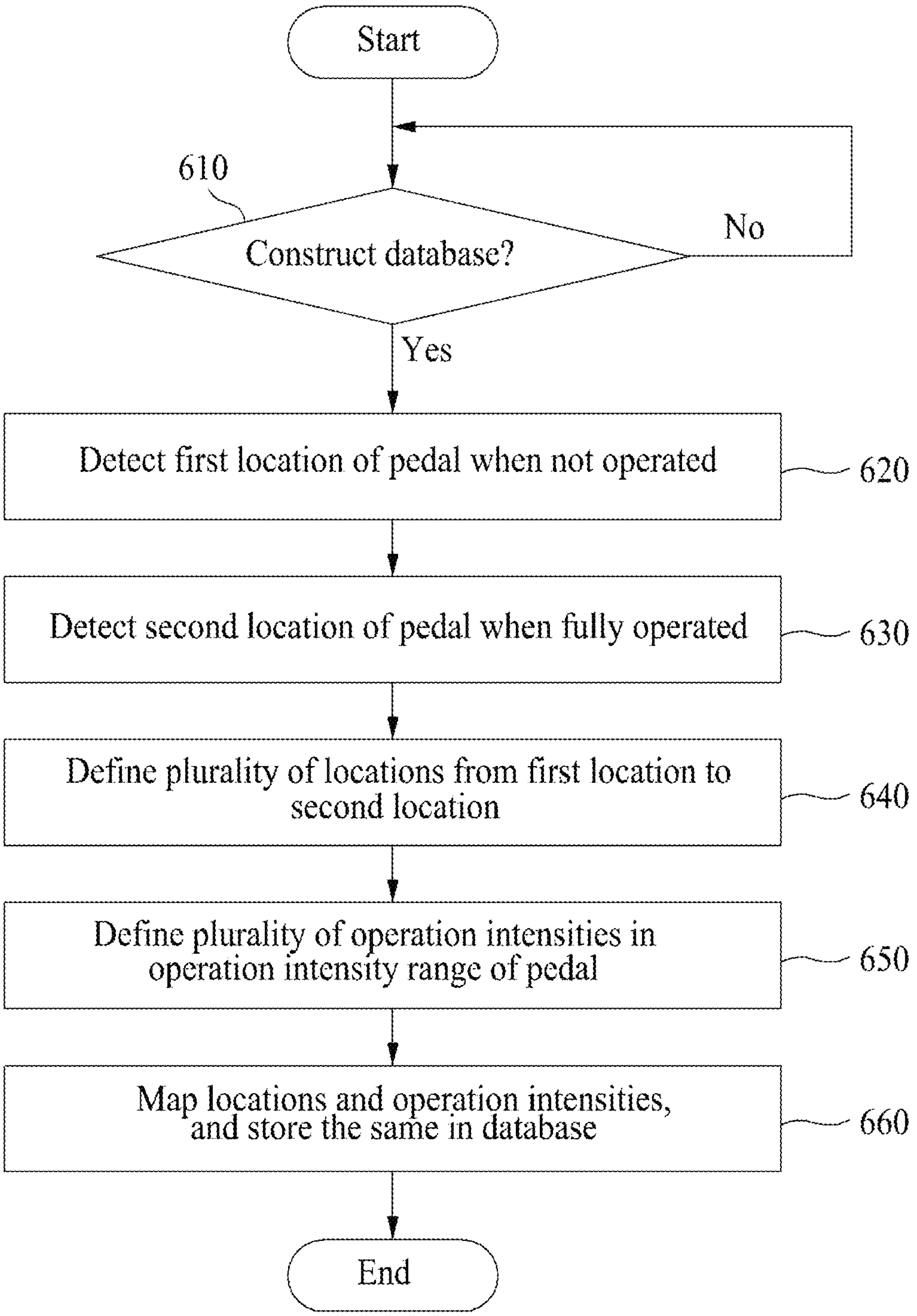
FIG. 6 is a flowchart illustrating an operating method of an electronic device for constructing a database according to various example embodiments.
Figure 7A:
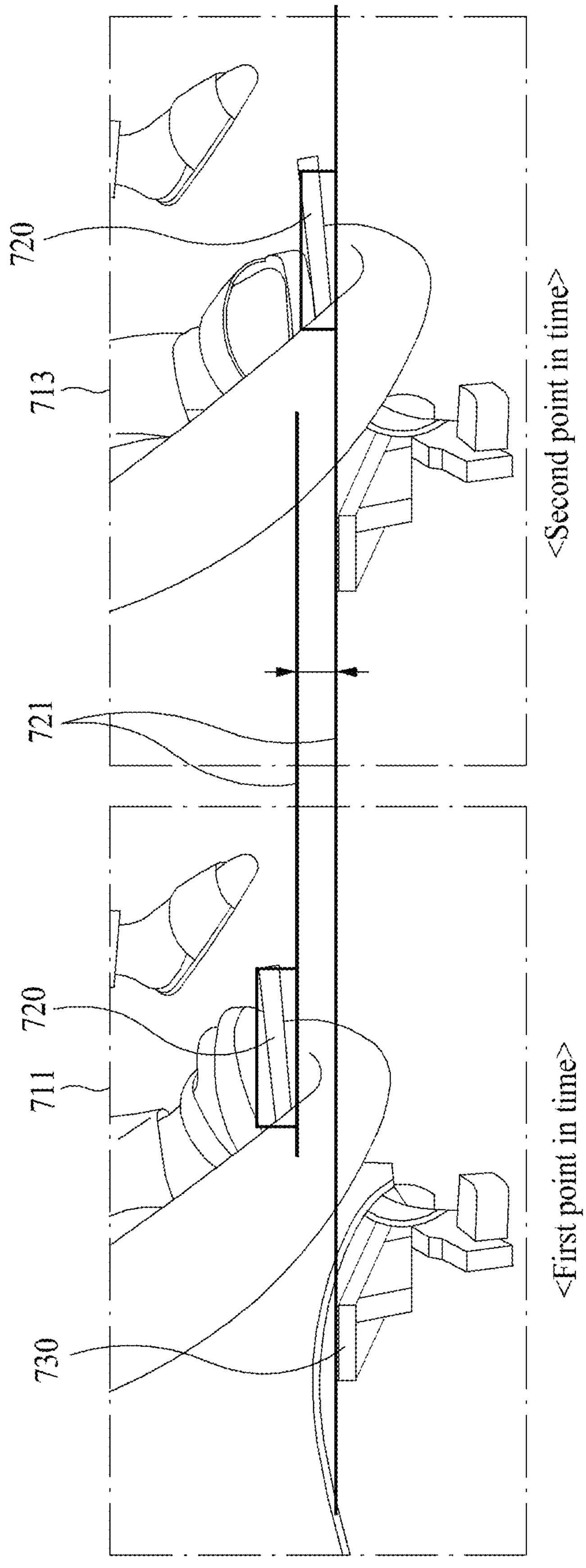
FIGS. 7A and 7B illustrate examples for describing operation characteristics of an electronic device for detecting a location of a pedal according to an example embodiment.
Figure 7B:
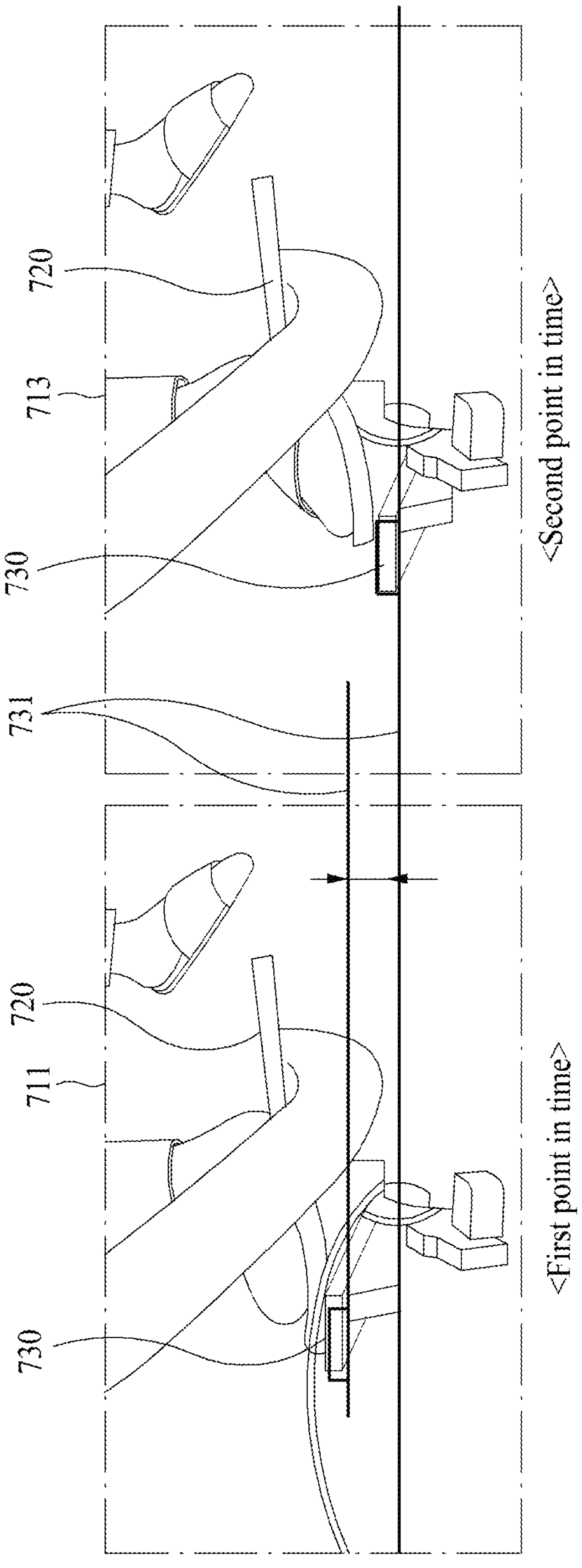
Figure 8:
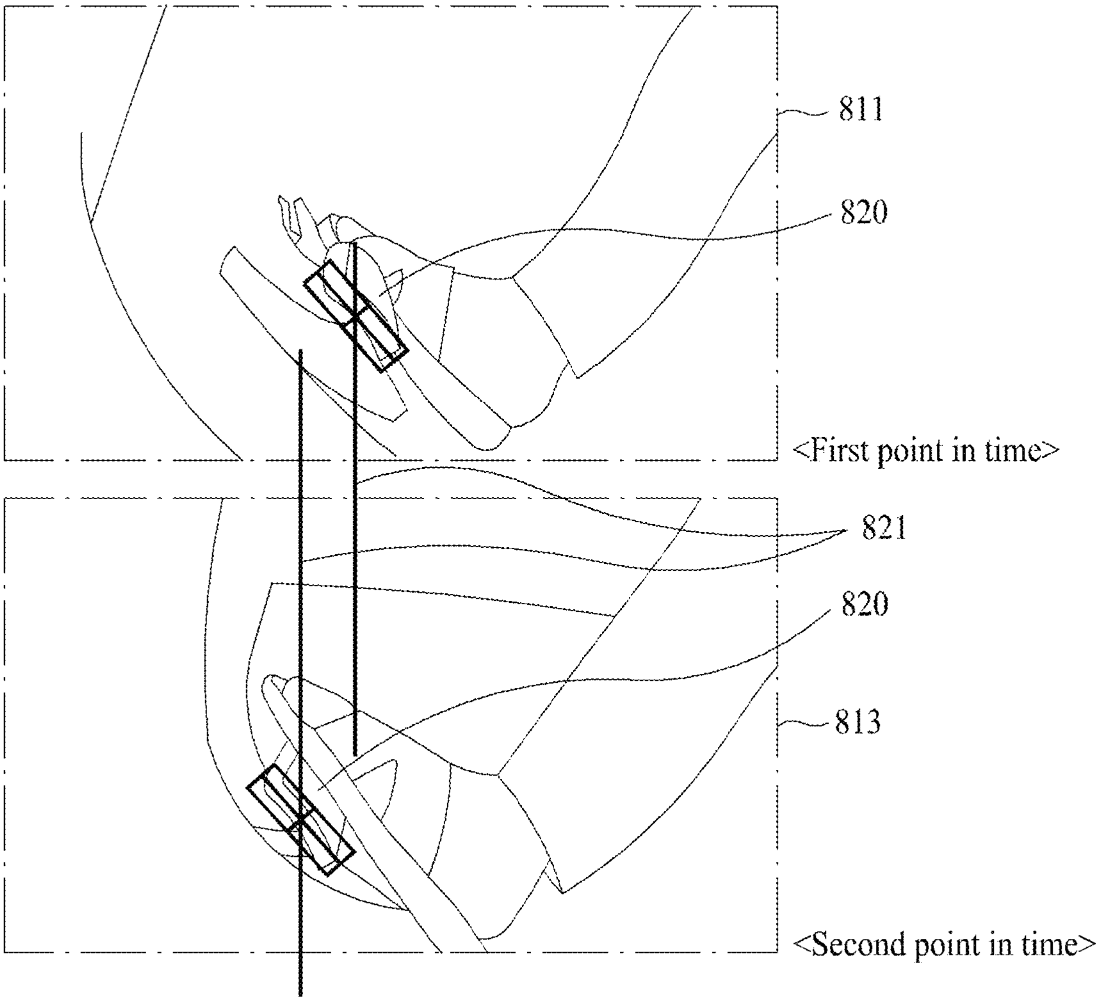
FIG. 8 illustrates an example for describing operation characteristics of an electronic device for detecting a location of a pedal according to another example embodiment.

FIG. 6 is a flowchart illustrating an operating method of the electronic device 120 for constructing a database according to various example embodiments. FIGS. 7A and 7B illustrate examples for describing operation characteristics of the electronic device 120 for detecting a location of a pedal 720, 730 according to an example embodiment. FIG. 8 illustrates an example for describing operation characteristics of the electronic device 120 for detecting a location of a pedal 820 according to another example embodiment.

Referring to FIG. 6, in operation 610, the electronic device 120 may detect an event for constructing a database. Here, the event may be a signal for turning on the electronic device 120 generated through the input module 520 after the video processing system 100 or the electronic device 120 is mounted to the vehicle. Alternatively, the event may represent a signal for initializing the video processing system 100 or the electronic device 120 generated through the input module 520. In detail, when the event is generated through the input module 520, the processor 570 may detect the event.

Then, in operation 620, the electronic device 120 may detect a location of the pedal 720, 730, 820 when not operated, that is, a first location. In detail, the processor 570 may detect the first location by analyzing a video 711, 811 of a first point in time acquired from the camera device 110. Then, in operation 630, the electronic device 120 may detect a location of the pedal 720, 730, 820 when fully operated, that is, a second location. In detail, the processor 570 may detect the second location by analyzing a video 713, 813 of a second point in time acquired from the camera device 110. The processor 570 may recognize a reference axis 721, 731, 821 preset for the pedal 720, 730, 820 within the video 711, 811 of the first point in time and the video 713, 813 of the second point in time and then may detect each of the first location and the second location of the reference axis 721, 731, 821. Here, the reference axis 721, 731, 821 may include at least one of the horizontal axis and the vertical axis. Here, the processor 570 may include the first location and the second location of at least one of the brake pedal 720, 820 and the accelerator pedal 730.

To this end, the processor 570 may output a guidance message to the driver. In detail, the processor 570 may output the guidance message for non-operation of the pedal 720, 730, 820 at the first point in time and may output the guidance message for full operation of the pedal 720, 730, 820 at the second point in time. Here, the guidance message may include at least one of a visual message and an auditory message. For example, the processor 570 may directly output the guidance message through the display module 530 or the audio output module 550. As another example, the processor 570 may transmit the guidance message to another electronic device (used by the driver) through the communication module 510 to be output through the other electronic device. As another example, the processor 570 may transmit the guidance message to the vehicle through the interface module 540 to be output through at least one component of the vehicle.

According to an example embodiment, when the camera device 110 is installed in front of at least one of the brake pedal 720 and the accelerator pedal 730, the processor 570 may detect the first location of the front surface of at least one of the brake pedal 720 and the accelerator pedal 730 from the video 711 of the first point in time as shown in the left drawings of FIGS. 7A and 7B and then may detect the second location of the front surface of at least one of the brake pedal 720 and the accelerator pedal 730 from the video 713 of the second point in time as shown in the right drawings of FIGS. 7A and 7B. Here, as illustrated, the reference axis 721, 731 may be the horizontal axis, but without being limited thereto, may be, for example, the vertical axis or the combination of the horizontal axis and the vertical axis. In more detail, when the camera device 110 is installed in front of the brake pedal 720 or both the brake pedal 720 and the accelerator pedal 730, the processor 570 may detect the first location of the reference axis 721 on the front surface of the brake pedal 720 as shown in the left drawing of FIG. 7A and then may detect the second location of the reference axis 721 on the front surface of the brake pedal 720 as shown in the right drawing of FIG. 7A. Meanwhile, when the camera device 110 is installed in front of the accelerator pedal 730 or both the brake pedal 720 and the accelerator pedal 730, the processor 570 may detect the first location of the reference axis 731 on the front surface of the accelerator pedal 730 as shown in the left drawing of FIG. 7B and then may detect the second location of the reference axis 731 on the front surface of the accelerator pedal 730 as shown in the right drawing of FIG. 7B. Here, as illustrated, the processor 570 may recognize the reference axis 721, 731 for the lower side of the front surface, but without being limited thereto, for example, may recognize the reference axis 721, 731 for the center of the front surface or the upper side of the front surface.

According to another example embodiment, when the camera device 110 is installed on one side of the brake pedal 820, the processor 570 may detect the first location of one side surface of the brake pedal 820 in the video 811 of a first point in time as shown in the upper drawing of FIG. 8 and then, may detect the second location of the side surface of the brake pedal 820 in the video 813 of a second point in time. Here, the reference axis 821 may be the vertical axis, but without being limited thereto, may be, for example, the horizontal axis or the combination of the horizontal axis and the vertical axis. In more detail, the processor 570 may detect the first location of the reference axis 821 on the side surface of the brake pedal 820 as shown in the upper drawing of FIG. 8 and then may detect the second location of the reference axis 821 on the side surface of the brake pedal 820 as shown in the lower drawing of FIG. 8. Here, as illustrated, the processor 570 may recognize the reference axis 821 for the center of the side surface, but without being limited thereto, for example, may recognize the reference axis 821 for a single point of the inner side (facing the driver) of the side surface or the outer side (on the other side of the inner side) of the side surface.

According to still example embodiment, when the camera device 110 is installed on one side of an accelerator pedal, the processor 570 may detect the first location of one side surface of the accelerator pedal in a video of a first point in time and then may detect the second location of the side surface of the accelerator pedal in a video of a second point in time although not illustrated. Here, a reference axis may be the vertical axis, the horizontal axis, or the combination of the horizontal axis and the vertical axis. In more detail, although not illustrated, the processor 570 may detect the first location of the reference axis on the side surface of the accelerator pedal and then detect the second location of the reference axis on the side surface of the accelerator pedal. Here, the processor 570 may recognize the reference axis for the center of the side surface or a single point of the inner side (facing the driver) or the outer side (on the other side of the inner side) of the side surface.

According to some example embodiments, to easily identify a location of the reference axis 721, 731, 821 in the pedal 720, 730, 820, an indicator (not shown) may be applied at an intersection point with the reference axis 721, 731, 821 present in the pedal 720, 730, 820. Therefore, the processor 570 may recognize the reference axis 721, 731, 821 by identifying the indicator within the video 711, 713, 811, 813 and may detect the location of the reference axis 721, 731, 821. For example, the indicator may be generated with at least one of a specific pattern, color, or light on the pedal 720, 730, 820, or may be attached thereto like a sticker.

In operation 640, the electronic device 120 may define a plurality of locations within the location range from a location of the pedal 720, 730, 820 when not operated to a location of the pedal 720, 730, 820 when fully operated. In detail, the processor 570 may define a plurality of locations from the first location to the second location. Here, the processor 570 may define the locations by dividing the location range into predetermined intervals by a predetermined number.

Then, in operation 650, the electronic device 120 may define a plurality of operation intensities within the operation intensity range from the minimum intensity to the maximum intensity determined for the pedal 720, 730, 820. In detail, the processor 570 may define the plurality of operation intensities from the minimum intensity to the maximum intensity. Here, the processor 570 may define operation intensities by dividing the operation intensity range into predetermined intervals by a predetermined number, that is, by the number of locations.

Finally, in operation 660, the electronic device 120 may map locations and operation intensities to each other, respectively, and may store the same in the database. In detail, the processor 570 may sequentially map the locations from the first location to the second location and the operation intensities from the minimum intensity to the maximum intensity to each other, respectively, and may store the same in the database. As a result, the processor 570 may store the database in the memory 560. According to some example embodiments, the processor 570 may further map and store the video 711, 811 when the pedal 720, 730, 820 is not operated and the video 713, 813 when the pedal 720, 730, 820 is fully operated in correspondence to the first location and the second location, respectively. This may be used to prove the reliability of the database, if necessary.

Figure 9:
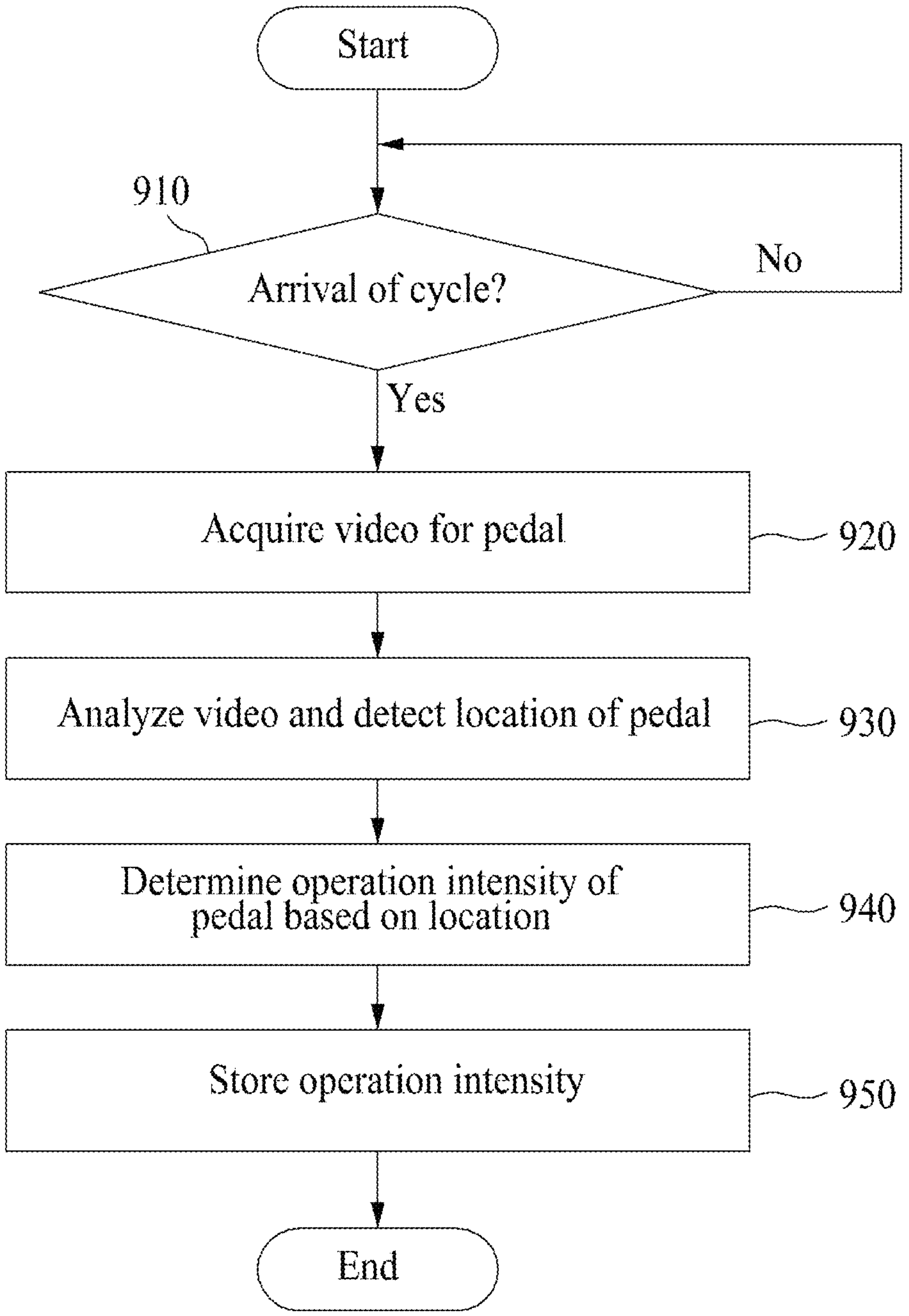
FIG. 9 is a flowchart illustrating an operating method of an electronic device for recording the operation intensity of a pedal according to various example embodiments.
Figure 10:
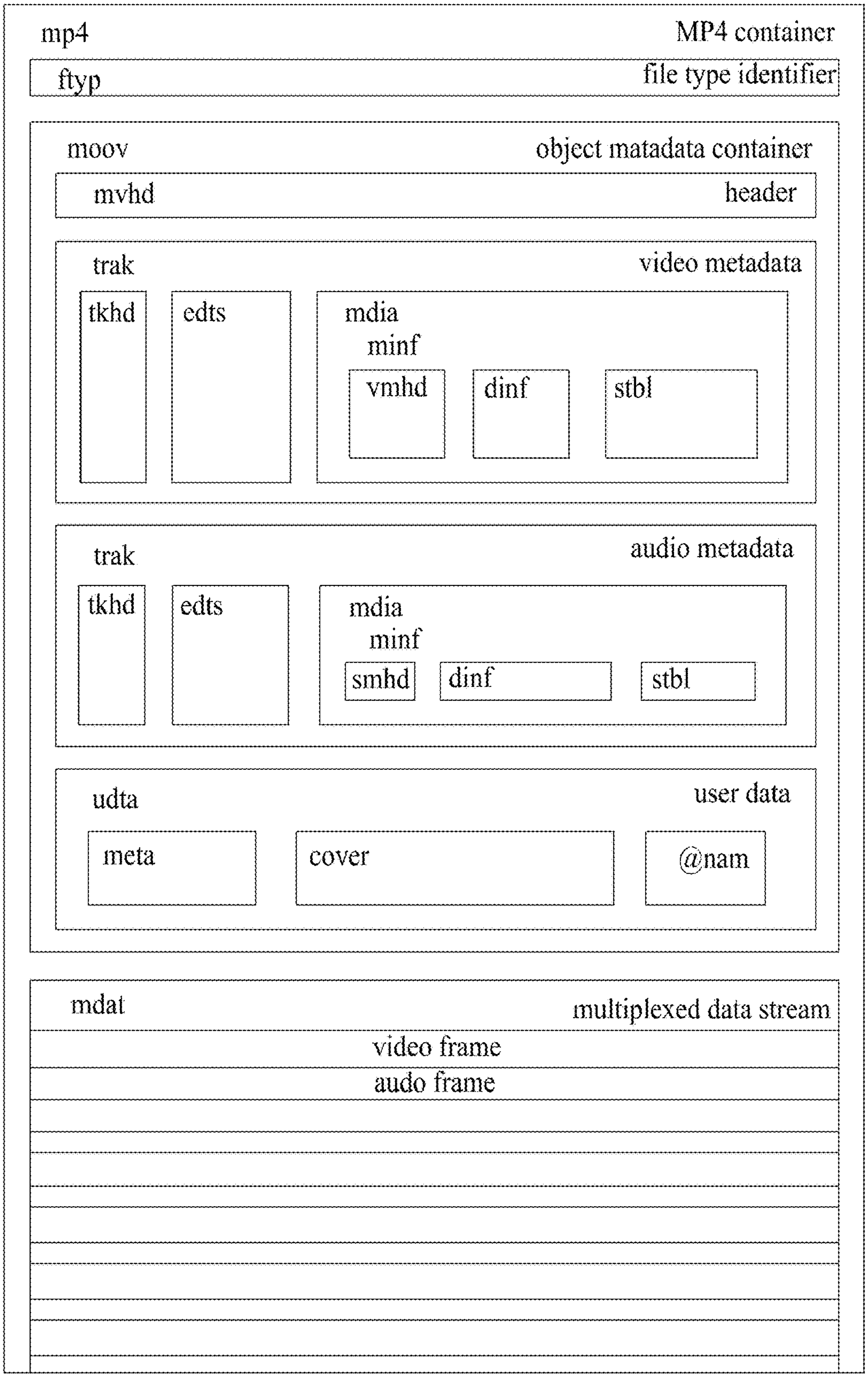
FIG. 10 illustrates an example for describing operation characteristics of an electronic device for storing the operation intensity according to various example embodiments.
Figure 11:
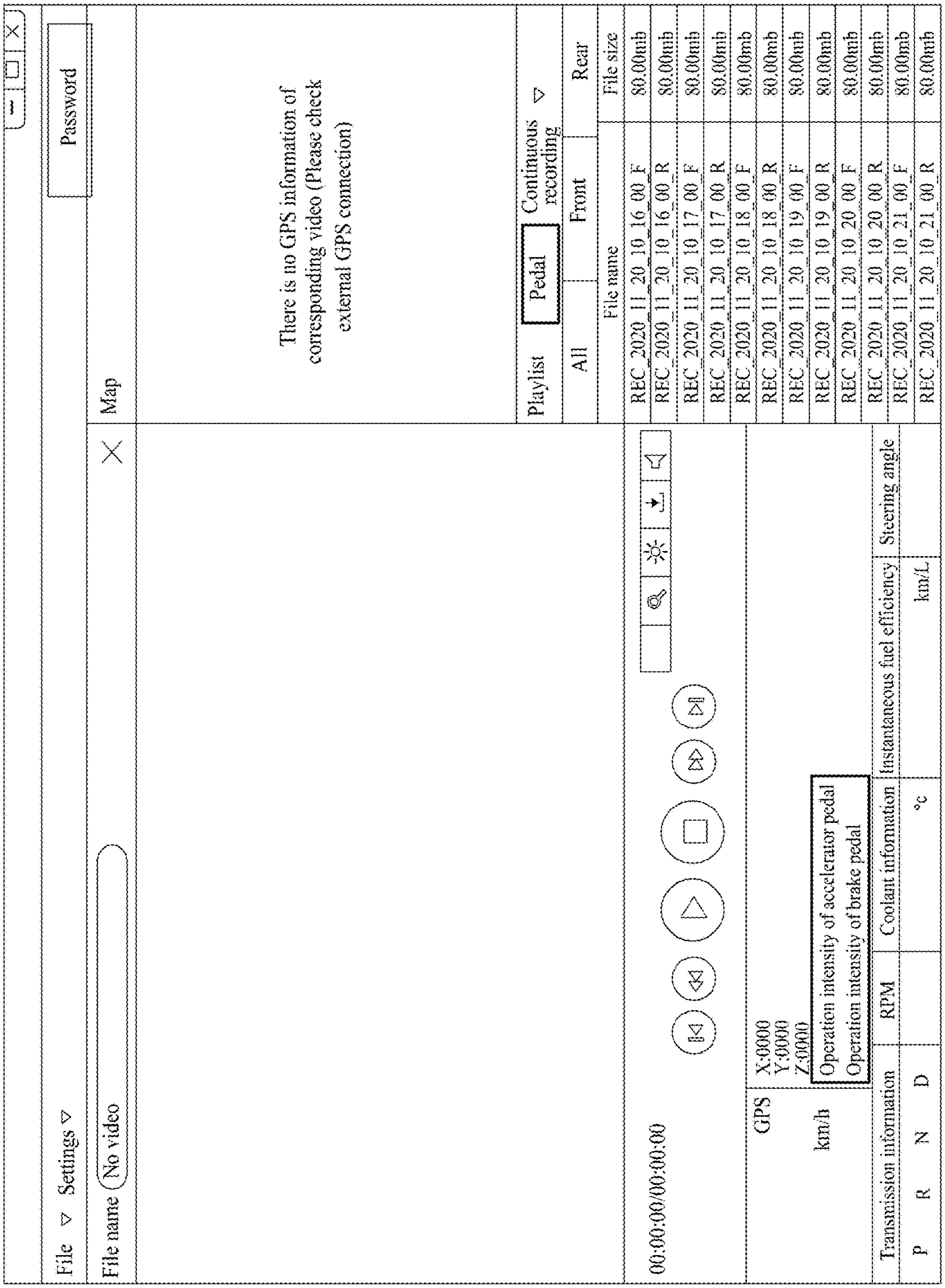
FIG. 11 illustrates an example for describing operation characteristics of an electronic device for displaying the operation intensity according to various example embodiments.

FIG. 9 is a flowchart illustrating an operating method of the electronic device 120 for recording the operation intensity of the pedal 320, 330, 420 according to various example embodiments. FIG. 10 illustrates an example for describing operation characteristics of the electronic device 120 for storing the operation intensity according to various example embodiments. FIG. 11 illustrates an example for describing operation characteristics of the electronic device 120 for displaying the operation intensity according to various example embodiments.

Referring to FIG. 9, in operation 910, the electronic device 120 may detect an arrival of a predetermined cycle to record the operation intensity of the pedal 320, 330, 420. Here, an event may occur to record the operation intensity according to the cycle. In detail, the processor 570 may detect the arrival of the cycle based on the event.

Then, in operation 920, the electronic device 120 may acquire a video for the pedal 320, 330, 420. To this end, the interface module 540 may be communicatively connected to the camera device 110 in a wired or wireless manner. In detail, the camera device 110 may capture the video 310, 410 for the pedal 320, 330, 420. To this end, the camera device 110 may be fixed adjacent to the pedal 320, 330, 420 in the vehicle. Here, the pedal 320, 330, 420 may include at least one of the brake pedal 320, 420 and the accelerator pedal 330. According to an example embodiment, the camera device 110 may be installed in front of at least one of the brake pedal 320 and the accelerator pedal 330. In this case, as shown in FIGS. 3A and 3B, the camera device 110 may capture the video 310 for the front surface of at least one of the brake pedal 320 and the accelerator pedal 330. According to another example embodiment, the camera device 110 may be installed on one side of the brake pedal 420. In this case, as shown in FIG. 4, the camera device 110 may capture the video 410 for one side surface of the brake pedal 420. According to still example embodiment, the camera device 110 may be installed on one side of the accelerator pedal. In this case, although not illustrated, the camera device 110 may capture a video for one side surface of the accelerator pedal. Then, the camera device 110 may transmit the video 310, 410 to the electronic device 120. Therefore, the processor 570 may acquire the video 310, 410 from the camera device 110 through the interface module 540.

Then, in operation 930, the electronic device 120 may analyze the video 310, 410, and may detect a location of the pedal 320, 330, 420. In detail, the processor 570 may recognize the reference axis 321, 331, 421 preset for the pedal 320, 330, 420 within the video 310, 410 and then, detect the location of the reference axis 321, 331, 421. Here, the reference axis 321, 331, 421 may include at least one of the horizontal axis and the vertical axis. Here, the processor 570 may detect a location of at least one of the brake pedal 320, 420 and the accelerator pedal 330.

According to an example embodiment, when the camera device 110 is installed in front of at least one of the brake pedal 320 and the accelerator pedal 330, the processor 570 may detect a location of the front surface of at least one of the brake pedal 320 and the accelerator pedal 330 in the video 310 as shown in FIGS. 3A and 3B. Here, as illustrated, the reference axis 321, 331 may be the horizontal axis, but without being limited thereto, may be, for example, the vertical axis or the combination of the horizontal axis and the vertical axis. In more detail, when the camera device 110 is installed in front of the brake pedal 320 or both the brake pedal 320 and the accelerator pedal 330, the processor 570 may recognize the reference axis 321 on the front surface of the brake pedal 320 as shown in FIG. 3A and then detect a location of the reference axis 321. Meanwhile, when the camera device 110 is installed in front of the accelerator pedal 330 or both the brake pedal 320 and the accelerator pedal 330, the processor 570 may recognize the reference axis 331 on the front surface of the accelerator pedal 330 as shown in FIG. 3B and then may detect a location of the reference axis 331. Here, as illustrated, the electronic device 120 may recognize the reference axis 321, 331 for the lower side of the front surface, but without being limited thereto, may recognize the reference axis 321, 331, for example, for the center of the front surface or the upper side of the front surface.

According to another example embodiment, when the camera device 110 is installed on one side of the brake pedal 420, the processor 570 may detect a location of one side surface of the brake pedal 420 in the video 410 as shown in FIG. 4. Here, the reference axis 421 may be the vertical axis, but without being limited thereto, may be, for example, the horizontal axis or the combination of the horizontal axis and the vertical axis. In more detail, as illustrated, the processor 570 may recognize the reference axis 421 on the side surface of the brake pedal 420 and then detect a location of the reference axis 421. Here, as illustrated, the processor 570 may recognize the reference axis 421 for the center of the side surface, but without being limited thereto, may recognize the reference axis 421 for a single point of the inner side (facing the driver) of the side surface or the outer side (on the other side of the inner side) of the side surface.

According to still example embodiment, when the camera device 110 is installed on one side of the accelerator pedal, the processor 570 may detect a location of one side surface of the accelerator pedal in a video although not illustrated. Here, a reference axis may be the vertical axis, the horizontal axis, or the combination of the horizontal axis and the vertical axis. In more detail, although not illustrated, the processor 570 may recognize the reference axis on the side surface of the accelerator pedal and then may detect a location of the reference axis. Here, the processor 570 may recognize the reference axis for the center of the side surface, or for a single point of the inner side (facing the driver) of the side surface or the outer side (on the other side of the inner side) of the side surface.

According to some example embodiments, to easily identify a location of the reference axis 321, 331, 421 in the pedal 320, 330, 420, an indicator (not shown) may be applied at an intersection point with the reference axis 321, 331, 421 present in the pedal 320, 330, 420. Therefore, the processor 570 may recognize the reference axis 321, 331, 421 by identifying the indicator within the video 310, 410 and may detect the location of the reference axis 321, 331, 421. For example, the indicator may be generated with at least one of a specific pattern, color, or light on the pedal 320, 330, 420, or may be attached thereto like a sticker.

Then, in operation 940, the electronic device 120 may determine the operation intensity of the pedal 320, 330, 420 based on the location. Here, the memory 560 may store the database in which different locations of the pedal 320, 330, 420 and different operation intensities of the pedal 320, 330, 420 are mapped to each other, respectively. Using the database, the processor 570 may determine the operation intensity that is mapped to the location. In detail, in the database, a plurality of locations and a plurality of operation intensities may be defined in equal numbers and mapped to each other, respectively.

Finally, in operation 950, the electronic device 120 may store the operation intensity. In detail, the processor 570 may store the operation intensity while storing the video 310, 410. Here, the processor 570 may store each of the video 310, 410 and the operation intensity in at least one of a first memory embedded in the electronic device 120 and a second memory detachably provided to the electronic device 120. Here, the processor 570 may store the operation intensity in correspondence to a point in time at which the video 310, 410 is captured. According to an example embodiment, the processor 570 may store the operation intensity in a file in which the video 310, 410 is recorded. According to another example embodiment, the processor 570 may store the operation intensity in a file separate from the video 310, 410.

For example, when the file in which the video 310, 410 is recorded is in MPEG4 format, the processor 570 may store the operation intensity in a text processing field of the corresponding file. In more detail, the file in the MPEG4 format may have a structure as shown in FIG. 10 and may include a file type box (ftyp), a movie box (moov) for storing metadata for media, and a media data box (mdat) for storing media. Here, the movie box may include a movie header box (mvhd), track boxes (trak) for storing video metadata and audio metadata, respectively, and a user-data box (udta) corresponding to the text processing field. In this case, the processor 570 may store the operation intensity in the text processing field of the moving box while storing the video 310, 410 in the media data box.

According to various example embodiments, the processor 570 may encrypt the operation intensity using a preset encryption key and then store the same. The encryption key may be uniquely set for the electronic device 120 and may also be verified by the manufacturer of the electronic device 120. Here, the encryption key may be generated using the combination of the manufacturer, model name, and serial number of the electronic device 120. For example, the encryption key may be generated through arithmetic operations of four digits following the model name and the serial number. As another example, the encryption key may be generated through arithmetic operations of the manufacturer, the first four digits of the serial number, and the last four digits of the serial number. Meanwhile, the processor 570 may encrypt the video 310, 410 using the encryption key identical to or different from the encryption key of the operation intensity and may store the same.

According to various example embodiments, the operation intensity may be displayed only through a predetermined viewer program. The viewer program may decrypt the encrypted operation intensity using the encryption key and then display the decrypted operation intensity. To this end, the viewer program may be distributed by the manufacturer of the electronic device 120 and may verify the encryption key of the electronic device 120. Here, the viewer program may display the video 310, 410 and the operation intensity, and may display only the operation intensity. For example, the viewer program may be as shown in FIG. 11. In this case, in response to the encryption key being input as a password, the viewer program may display the video 310, 410 and the operation intensity of the pedal 320, 330, 420 corresponding to the video 310, 410, that is, at least one of the brake pedal 320, 420 and the accelerator pedal 330. In the case of not using the viewer program, the operation intensity may not be normally displayed, and may be displayed as a different value, may be displayed shaded, or may not be displayed at all.

According to an example embodiment, the processor 570 may store the viewer program in the memory 560 and, in response to an external request, may display the operation intensity through the display module 530 using the viewer program. Here, the processor 570 may decrypt and then display the operation intensity using the encryption key. According to another example embodiment, the processor 570 may transmit the operation intensity to the external device through the communication module 510 or the interface module 540. In this case, the external device may store the viewer program, and may display the operation intensity using the viewer program. According to still example embodiment, when the operation intensity is stored in the second memory detachably provided to the electronic device 120, the second memory may be attached to the external device. In this case, the external device may store the viewer program, and may display the operation intensity using the viewer program.

According to the present disclosure, the electronic device 120 may store the operation intensity of the pedal 320, 330, 420 based on the video 310, 410 for the pedal 320, 330, 420. Here, the electronic device 120 may record at least one of the operation intensity of the brake pedal 320, 420 and the operation intensity of the accelerator pedal 330. This may be used as data to prove not only an operation status of the pedal 320, 330, 420 but also the operation intensity of the pedal 320, 330, 420. Therefore, in a situation in which it is difficult to determine the cause, such as an accident suspected of sudden acceleration of the vehicle, it is possible to relatively accurately determine whether the driver was at fault. Here, when the electronic device 120 records the operation intensity, encryption may make it possible to improve the reliability for the operation intensity and to prevent indiscriminate sharing In short, the present disclosure provides the electronic device 120 of the vehicle for recording the operation intensity of the pedal 320, 330, 420 based on the video 310, 410 and an operating method of the same.

In the present disclosure, an operating method of the electronic device 120 mounted to the vehicle may include analyzing the video 310, 410 for the pedal 320, 330, 420 and detecting a location of the pedal 320, 330, 420 (operation 930), determining the operation intensity of the pedal 320, 330, 420 based on the location (operation 940), and storing the operation intensity (operation 950).

According to various example embodiments, the electronic device 120 may store a database in which different locations of the pedal 320, 330, 420 and different operation intensities of the pedal 320, 330, 420 are mapped to each other, respectively, and the determining the operation intensity (operation 940) may include determining the operation intensity that is mapped to the location using the database.

According to various example embodiments, the detecting the location (operation 930) may include recognizing the reference axis 321, 331, 421 preset for the pedal 320, 330, 420 within the video 310, 410, and detecting the location of the reference axis 321, 331, 421.

According to various example embodiments, the operating method of the electronic device 120 may further include constructing the database, and the constructing the database may include analyzing the video 711, 811 for the pedal 720, 730, 820 when the pedal 720, 730, 820 is not operated and detecting a first location of the pedal 720, 730, 820 (operation 620), analyzing the video 713, 813 for the pedal 720, 730, 820 when the pedal 720, 730, 820 is fully operated and detecting a second location of the pedal 720, 730, 820 (operation 630), defining the locations arranged at a predetermined interval from the first location to the second location (operation 640), defining the operation intensities by dividing the operation intensity range determined for the pedal 720, 730, 820 by the number of locations (operation 650), and mapping the locations and the operation intensities to each other, respectively, and storing the same in the database (operation 660).

According to various example embodiments, the constructing the database may be performed when mounting the electronic device 120 to the vehicle or when initializing the electronic device 120 in the vehicle.

According to various example embodiments, the database may be generated for a vehicle model of the vehicle by the manufacturer of the vehicle or the electronic device 120.

According to various example embodiments, the storing the operation intensity (operation 950) may include at least one of storing the operation intensity in a file in which the video 310, 410 is recorded, and storing the operation intensity in a file separate from the video 310, 410.

According to various example embodiments, the storing the operation intensity (operation 950) may include encrypting the operation intensity using a preset encryption key; and storing the encrypted operation intensity.

According to various example embodiments, the operation intensity may be displayed through a predetermined viewer program.

According to various example embodiments, the storing the operation intensity in the file in which the video 310, 410 is recorded may include storing the operation intensity in a text processing field of the file when the file in which the video 310, 410 is recorded is in MPEG4 format.

According to various example embodiments, the operating method of the electronic device 120 may be periodically repeated.

In the present disclosure, the electronic device 120 mounted to the vehicle may include the memory 560, and the processor 570 configured to connect to the memory 560 and to execute at least one instruction stored in the memory 560, and the processor 570 may be configured to analyze the video 310, 410 for the pedal 320, 330, 420 and detect a location of the pedal 320, 330, 420, to determine the operation intensity of the pedal 320, 330, 420 based on the location, and to store the operation intensity in the memory 560.

According to various example embodiments, the memory 560 may be configured to store the database in which different locations of the pedal 320, 330, 420 and different operation intensities of the pedal 320, 330, 420 are mapped to each other, respectively, and the processor 570 may be configured to determine the operation intensity that is mapped to the location using the database.

According to various example embodiments, the processor 570 may be configured to recognize the reference axis 321, 331, 421 preset for the pedal 320, 330, 420 within the video 310, 410, and to detect the location of the reference axis 321, 331, 421.

According to various example embodiments, the processor 570 may be configured to construct the database by analyzing the video 711, 811 for the pedal 720, 730, 820 when the pedal 720, 730, 820 is not operated and detecting a first location of the pedal 720, 730, 820, by analyzing the video 713, 813 for the pedal 720, 730, 820 when the pedal 720, 730, 820 is fully operated and detecting a second location of the pedal 720, 730, 820, by defining the locations arranged at a predetermined interval from the first location to the second location, by defining the operation intensities by dividing the operation intensity range determined for the pedal 720, 730, 820 by the number of locations, and by mapping the locations and the operation intensities to each other, respectively.

According to various example embodiments, the processor 570 may be configured to construct the database when mounting the electronic device 120 to the vehicle or when initializing the electronic device 120 in the vehicle.

According to various example embodiments, the database may be generated for a vehicle model of the vehicle by the manufacturer of the vehicle or the electronic device 120.

According to various example embodiments, the processor 570 may be configured to store the operation intensity in a file in which the video 310, 410 is recorded, or to store the operation intensity in a file separate from the video 310, 410.

According to various example embodiments, the processor 570 may be configured to encrypt the operation intensity using a preset encryption key and to store the encrypted operation intensity.

According to various example embodiments, the processor 570 may be configured to decrypt the encrypted operation intensity using the encryption key and to display the decrypted operation intensity through a predetermined viewer program.

According to various example embodiments, the processor 570 may be configured to store the operation intensity in a text processing field when a file in which the video 310, 410 is recorded is in MPEG4 format.

According to various example embodiments, the processor 570 may be configured to periodically store the operation intensity of the pedal 720, 730, 820.

In the present disclosure, the video processing system 100 mounted to the vehicle may include the camera device 110 fixed adjacent to the pedal 320, 330, 420 and configured to capture the video 310, 410 for the pedal 320, 330, 420, and the electronic device 120 configured to analyze the video 310, 410 and detect a location of the pedal 320, 330, 420, to determine the operation intensity of the pedal 320, 330, 420 based on the location, and to store the operation intensity.

According to various example embodiments, the pedal 320, 330, 420 may include at least one of the brake pedal 320, 420 and the accelerator pedal 330, and the camera device 110 may be installed in front of at least one of the brake pedal 320 and the accelerator pedal 330, or may be installed on one side of the brake pedal 420 or the accelerator pedal (not shown).

According to various example embodiments, the electronic device 120 may be configured to store the database in which different locations of the pedal 320, 330, 420 and different operation intensities of the pedal 320, 330, 420 are mapped to each other, respectively, and to determine the operation intensity that is mapped to the location using the database.

According to various example embodiments, the electronic device 120 may be configured to recognize the reference axis 321, 331, 421 preset for the pedal 320, 330, 420 within the video 310, 410, and to detect the location of the reference axis 321, 331, 421.

In the present disclosure, an operating method of the video processing system 100 mounted to the vehicle may include capturing, by the camera device 110 fixed adjacent to the pedal 320, 330, 420, the video 310, 410 for the pedal 320, 330, 420 (operation 210), analyzing, by the electronic device 120, the video 310, 410 and detecting a location of the pedal 320, 330, 420 (operation 230), determining, by the electronic device 120, the operation intensity of the pedal 320, 330, 420 based on the location (operation 240), and storing, by the electronic device 120, the operation intensity (operation 250).

According to various example embodiments, the pedal 320, 330, 420 may include at least one of the brake pedal 320, 420 and the accelerator pedal 330, and the camera device 110 may be installed in front of at least one of the brake pedal 320 and the accelerator pedal 330, or may be installed on one side of the brake pedal 420 or the accelerator pedal (not shown).

According to various example embodiments, the electronic device 120 may store the database in which different locations of the pedal 320, 330, 420 and different operation intensities of the pedal 320, 330, 420 are mapped to each other, respectively, and the determine the operation intensity (operation 240) may include determining the operation intensity that is mapped to the location using the database.

According to various example embodiments, the detecting the location (operation 230) may include recognizing the reference axis 321, 331, 421 preset for the pedal 320, 330, 420 within the video 310, 410, and detecting the location of the reference axis 321, 331, 421.

Figure 12:
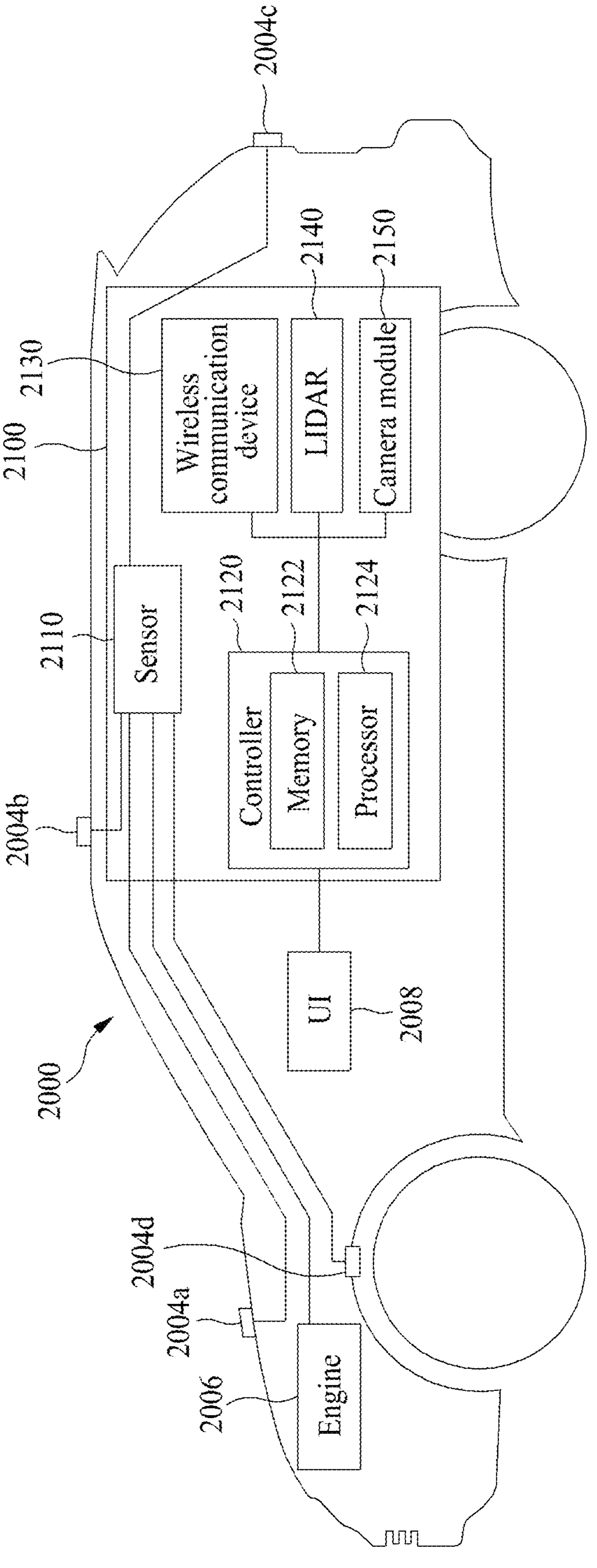
FIG. 12 is a block diagram illustrating a vehicle to which a video processing system is mounted according to various example embodiments.
Figure 13:
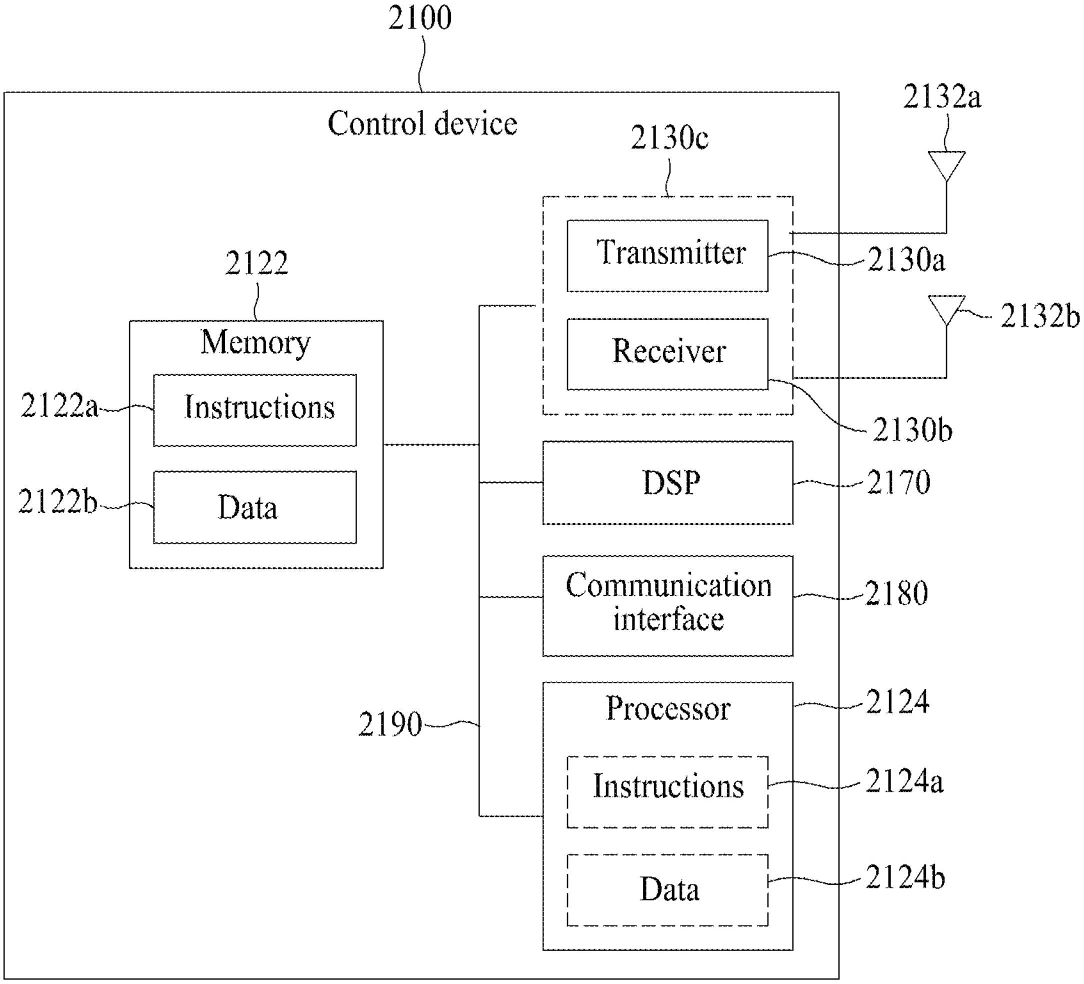
FIG. 13 is a block diagram illustrating a control device of the vehicle of FIG. 12.

FIG. 12 is a block diagram illustrating a vehicle 2000 to which the video processing system 100 is mounted according to various example embodiments. FIG. 13 is a block diagram illustrating a control device 2100 of the vehicle of FIG. 12.

Referring to FIGS. 12 and 13, the video processing system 100 according to various example embodiments may be mounted to the vehicle 2000 and the vehicle 2000 may include the control device 2100. Here, the vehicle 2000 may be an autonomous vehicle. In some example embodiments, at least one component of the electronic device 100 may be integrated into at least one component of the video processing system 100.

The control device 2100 may include a controller 2120 that includes a memory 2122 and a processor 2124, a sensor 2110, a wireless communication device 2130, a LiDAR device 2140, and a camera module 2150.

The controller 2120 may be configured at a time of manufacture by a manufacturing company of the vehicle or may be additionally configured to perform an autonomous driving function after manufacture. Alternatively, a configuration to continuously perform an additional function by upgrading the controller 2120 configured at the time of manufacture may be included.

The controller 2120 may forward a control signal to the sensor 2110, an engine 2006, a user interface (UI) 2008, the wireless communication device 2130, the LIDAR device 2140, and the camera module 2150 included as other components in the vehicle. Also, although not illustrated, the controller 2120 may forward a control signal to an acceleration device, a braking system, a steering device, or a navigation device associated with driving of the vehicle.

The controller 2120 may control the engine 2006. For example, the controller 2120 may sense a speed limit of a road on which the vehicle 2000 is driving and may control the engine 2006 such that a driving speed may not exceed the speed limit, or may control the engine 2006 to increase the driving speed of the vehicle 2000 within the range of not exceeding the speed limit. Additionally, when sensing modules 2004*a*, 2004*b*, 2004*c*, and 2004*d* sense an external environment of the vehicle and forward the same to the sensor 2110, the controller 2120 may receive external environment information, may generate a signal for controlling the engine 2006 or a steering device (not shown), and thereby control driving of the vehicle.

When another vehicle or an obstacle is present in front of the vehicle, the controller 2120 may control the engine 2006 or the braking system to decrease the driving speed and may also control a trajectory, a driving route, and a steering angle in addition to the speed. Alternatively, the controller 2120 may generate a necessary control signal according to recognition information of other external environments, such as, for example, a driving lane, a driving signal, etc., of the vehicle, and may control driving of the vehicle.

The controller 2120 may also control driving of the vehicle by communicating with a nearby vehicle or a central server in addition to autonomously generating the control signal and by transmitting an instruction for controlling peripheral devices based on the received information.

Further, if a location or an angle of view of the camera module 2150 is changed, it may be difficult for the controller 2120 to accurately recognize a vehicle or a lane. To prevent this, the controller 2120 may generate a control signal for controlling a calibration of the camera module 2150. Therefore, the controller 2120 may generate a calibration control signal for the camera module 2150 and may continuously maintain a normal mounting location, direction, angle of view, etc., of the camera module 2150 regardless of a change in a mounting location of the camera module 2150 by a vibration or an impact occurring due to a motion of the autonomous vehicle 2000. When prestored information on an initial mounting location, direction, and angle of view of the camera module 2120 differs from information on the initial mounting location, direction, and angle of view of the camera module 2120 that are measured during driving of the autonomous vehicle 2000 by a threshold or more, the controller 2120 may generate a control signal for performing calibration of the camera module 2120.

The controller 2120 may include the memory 2122 and the processor 2124. The processor 2124 may execute software stored in the memory 2122 in response to the control signal of the controller 2120. In detail, the controller 2120 may store, in the memory 2122, data and instructions for detecting a visual field view from a rear view video of the vehicle 2000, and the instructions may be executed by the processor 2124 to perform one or more methods disclosed herein.

Here, the memory 2122 may be stored in a recording medium executable at the non-volatile processor 2124. The memory 2122 may store software and data through an appropriate external device. The memory 2122 may include random access memory (RAM), read only memory (ROM), hard disk, and a memory device connected to a dongle.

The memory 2122 may at least store an operating system (OS), a user application, and executable instructions. The memory 2122 may store application data and arrangement data structures.

The processor 2124 may be a controller, a microcontroller, or a state machine as a microprocessor or an appropriate electronic processor.

The processor 2124 may be configured as a combination of computing devices. The computing device may be configured as a digital signal processor, a microprocessor, or an appropriate combination thereof.

Also, the control device 2100 may monitor internal and external features of the vehicle 2000 and may detect a state of the vehicle 2000 using at least one sensor 2110.

The sensor 2110 may include at least one sensing module 2004. The sensing module 2004 may be implemented at a specific location of the vehicle 2000 depending on a sensing purpose. The sensing module 2004 may be provided in a lower portion, a rear end, a front end, an upper end, or a side end of the vehicle 2000 and may be provided to an internal part of the vehicle, a tier, and the like.

Through this, the sensing module 2004 may sense driving information, such as the engine 2006, a tier, a steering angle, a speed, a vehicle weight, and the like, as internal vehicle information. Also, the at least one sensing module 2004 may include an acceleration sensor (operation 2110), a gyroscope, an image sensor (operation 2110), a radar, an ultrasound sensor, a LiDAR sensor, and the like, and may sense motion information of the vehicle 2000.

The sensing module 2004 may receive specific data, such as state information of a road on which the vehicle 2000 is present, nearby vehicle information, and an external environmental state such as weather, as external information, and may sense a vehicle parameter according thereto. The sensed information may be stored in the memory 2122 temporarily or in long-term depending on purposes.

The sensor 2110 may integrate and collect information of the sensing modules 2004 for collecting information generated inside and on outside the vehicle 2000.

The control device 2100 may further include the wireless communication device 2130.

The wireless communication device 2130 is configured to implement wireless communication between the vehicles 2000. For example, the wireless communication device 2130 enables the vehicles 2000 to communicate with a mobile phone of a user, another wireless communication device 2130, another vehicle, a central device (traffic control device), a server, and the like. The wireless communication device 2130 may transmit and receive a wireless signal according to a connection communication protocol. A wireless communication protocol may be WiFi, Bluetooth, Long-Term Evolution (LTE), code division multiple access (CDMA), wideband code division multiple access (WCDMA), and global systems for mobile communications (GSM). However, it is provided as an example only and the wireless communication protocol is not limited thereto.

Also, the vehicle 2000 may implement vehicle-to-vehicle (V2V) communication through the wireless communication device 2130. That is, the wireless communication device 2130 may perform communication with another vehicle and other vehicles on the roads through the V2V communication. The vehicle 2000 may transmit and receive information, such as driving warnings, traffic information, and environmental information, through the V2V communication and may also request another vehicle for information or may receive a request from the other vehicle. For example, the wireless communication device 2130 may perform the V2V communication using a dedicated short-range communication (DSRC) device or a celluar-V2V (CV2V) device. Also, in addition to the V2V communication, vehicle-to-everything (V2X) communication, communication between the vehicle and another object (e.g., electronic device carried by pedestrian), may be implemented through the wireless communication device 2130.

Also, the control device 2100 may include the LIDAR device 2140. The LIDAR device 2140 may detect an object around the vehicle 2000 during an operation, based on data sensed using a LIDAR sensor. The LIDAR device 2140 may transmit detection information to the controller 2120, and the controller 2120 may operate the vehicle 2000 based on the detection information. For example, when the detection information includes a vehicle ahead driving at a low speed, the controller 2120 may instruct the vehicle to decrease a speed through the engine 2006. Alternatively, the controller 2120 may instruct the vehicle to decrease a speed based on a curvature of a curve the vehicle enters.

The control device 2100 may further include the camera module 2150. The controller 2120 may extract object information from an external image captured from the camera module 2150, and may process the extracted object information using the controller 2120.

Also, the control device 2100 may further include imaging devices configured to recognize an external environment. In addition to the LIDAR device 2140, a radar, a GPS device, a driving distance measurement device (odometry), and other computer vision devices may be used. Such devices may selectively or simultaneously operate depending on necessity, thereby enabling further precise sensing.

The vehicle 2000 may further include the user interface (UI) 2008 for a user input to the control device 2100. The user interface 2008 enables the user to input information through appropriate interaction. For example, the user interface 2008 may be configured as a touchscreen, a keypad, and a control button. The user interface 2008 may transmit an input or an instruction to the controller 2120, and the controller 2120 may perform a vehicle control operation in response to the input or the instruction.

Also, the user interface 2008 may enable communication between an external device of the vehicle 2000 and the vehicle 2000 through the wireless communication device 2130. For example, the user interface 2008 may enable interaction with a mobile phone, a tablet, or other computer devices.

Further, although the example embodiment describes that the vehicle 2000 includes the engine 2006, it is provided as an example only. The vehicle 2000 may include a different type of a propulsion system. For example, the vehicle 2000 may run with electric energy, and may run with hydrogen energy or through a hybrid system with a combination thereof. Therefore, the controller 2120 may include a propulsion mechanism according to the propulsion system of the vehicle 2000 and may provide a control signal according thereto to each component of the propulsion mechanism.

Hereinafter, a configuration of the control device 2100 of the vehicle 2000 is described with reference to FIG. 13.

The control device 2100 may include the processor 2124. The processor 2124 may be a general-purpose single or multi-chip microprocessor, a dedicated microprocessor, a microcontroller, a programmable gate array, and the like. The processor 2124 may also be referred to as a central processing unit (CPU). Also, the processor 2124 may be a combination of a plurality of processors.

The control device 2100 also includes the memory 2122. The memory 2122 may be any electronic component capable of storing electronic information. The memory 2122 may include a combination of memories 2122 in addition to a unit memory.

According to various example embodiments, data and instructions 2122*a* of the vehicle 2000 may be stored in the memory 2122. When the processor 2124 executes the instructions 2122*a*, the instructions 2122*a* and a portion or all of the data 2122*b* required to perform command may be loaded to the processor 2124 (operation 2124*a* and 2124*b*).

The control device 2100 may include a transmitter 2130*a* and a receiver 2130*b*, or a transceiver 2130*c*, to allow transmission and reception of signals. One or more antennas 2132*a* and 2132*b* may be electrically connected to the transmitter 2130*a* and the receiver 2130*b*, or the transceiver 2130*c*, and may include additional antennas.

The control device 2100 may include a digital signal processor (DSP) 2170, and may control the vehicle to quickly process a digital signal through the DSP 2170.

The control device 2100 may also include a communication interface 2180. The communication interface 2180 may include one or more ports and/or communication modules configured to connect other devices to the control device 2100. The communication interface 2180 may enable interaction between the user and the control device 2100.

Various components of the control device 2100 may be connected through one or more buses 2190, and the buses 2190 may include a power bus, a control signal bus, a state signal bus, and a database bus. The components may forward mutual information through the buses 2190 under control of the processor 2124 and may perform desired functions.

The apparatuses described herein may be implemented using hardware components, software components, and/or a combination of the hardware components and the software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, other processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, computer storage medium or device, to provide instructions or data to the processing device or be interpreted by the processing device. The software also may be distributed over network coupled computer systems so that the software is stored and executed in a distributed fashion. The software and data may be stored by one or more computer readable storage mediums.

The methods according to various example embodiments may be implemented in a form of a program instruction executable through various computer methods and recorded in computer-readable media. Here, the media may be to continuously store a computer-executable program or to temporarily store the same for execution or download. The media may be various types of record methods or storage methods in which a single piece of hardware or a plurality of pieces of hardware are combined and may be distributed over a network without being limited to a medium that is directly connected to a computer system. Examples of the media include magnetic media such as hard disks, floppy disks, and magnetic tapes; optical media such as CD ROM and DVD; magneto-optical media such as floptical disks; and hardware devices that are specially configured to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

Various example embodiments and the terms used herein are not construed to limit description disclosed herein to a specific implementation and should be understood to include various modifications, equivalents, and/or substitutions of a corresponding example embodiment. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe corresponding components regardless of order or importance and the terms are simply used to distinguish one component from another component. The components should not be limited by the terms. When a component (e.g., first component) is described to be "(functionally or communicatively) connected to" or "accessed to" another component (e.g., second component), the component may be directly connected to the other component or may be connected through still another component (e.g., third component).

The term "module" used herein may include a unit configured as hardware, software, or firmware, and may be interchangeably used with the terms, for example, "logic," "logic block," "part," "circuit," etc. The module may be an integrally configured part, a minimum unit that performs one or more functions, or a portion thereof. For example, the module may be configured as an application-specific integrated circuit (ASIC).

According to various example embodiments, each of the components (e.g., module or program) may include a singular object or a plurality of objects. According to various example embodiments, at least one of the components or operations may be omitted. Alternatively, at least one another component or operation may be added. Alternatively or additionally, a plurality of components (e.g., modules or programs) may be integrated into a single component. In this case, the integrated component may perform one or more functions of each of the components in the same or similar manner as it is performed by a corresponding component before integration. According to various example embodiments, operations performed by a module, a program, or another component may be performed in a sequential, parallel, iterative, or heuristic manner. Alternatively, at least one of the operations may be performed in different sequence or omitted. Alternatively, at least one another operation may be added.

What is claimed is:

1. An operating method of an electronic device mounted to a vehicle, the method comprising:
- analyzing a video for a pedal and detecting a location of the pedal;
- determining the operation intensity of the pedal based on the location; and
- storing the operation intensity,
- wherein the electronic device stores a database in which different locations of the pedal and different operation intensities of the pedal are mapped to each other, respectively,
- wherein the determining of the operation intensity comprises determining the operation intensity that is mapped to the location using the database, and
- wherein the database is generated for a vehicle model of the vehicle by a manufacturer of the vehicle or the electronic device.

2. The method of claim 1, wherein the detecting of the location comprises:
- recognizing a reference axis preset for the pedal within the video; and
- detecting a location of the reference axis.

3. The method of claim 1, wherein the storing of the operation intensity comprises at least one of:
- storing the operation intensity in a file in which the video is recorded; and
- storing the operation intensity in a file separate from the video.

4. The method of claim 3, wherein the storing of the operation intensity in the file in which the video is recorded comprises storing the operation intensity in a text processing field of the file when the file in which the video is recorded is in MPEG4 format.

5. The method of claim 1, wherein the storing of the operation intensity comprises:
- encrypting the operation intensity using a preset encryption key; and
- storing the encrypted operation intensity.

6. The method of claim 1, wherein the operation intensity is displayed through a predetermined viewer program.

7. An electronic device mounted to a vehicle, the electronic device comprising:

a memory; and a processor configured to connect to the memory, and to execute at least one instruction stored in the memory, wherein the processor is configured to, analyze a video for a pedal and detect a location of the pedal, determine the operation intensity of the pedal based on the location, and store the operation intensity in the memory, wherein the memory is configured to store a database in which different locations of the pedal and different operation intensities of the pedal are mapped to each other, respectively, wherein the processor is configured to determine the operation intensity that is mapped to the location using the database, and wherein the database is generated for a vehicle model of the vehicle by a manufacturer of the vehicle or the electronic device.

8. The electronic device of claim 7, wherein the processor is configured to, recognize a reference axis preset for the pedal within the video, and detect a location of the reference axis.

9. The electronic device of claim 7, wherein the processor is configured to store the operation intensity in a file in which the video is recorded, or store the operation intensity in a file separate from the video.

10. The electronic device of claim 9, wherein the processor is configured to store the operation intensity in a text processing field of the file when the file in which the video is recorded is in MPEG4 format.

11. The electronic device of claim 7, wherein the processor is configured to, encrypt the operation intensity using a preset encryption key, and store the encrypted operation intensity.

12. The electronic device of claim 7, wherein the operation intensity is displayed through a predetermined viewer program.

13. An operating method of an electronic device mounted to a vehicle, the method comprising:

constructing a database in which different locations of a pedal and different operation intensities of the pedal are mapped to each other, respectively;

analyzing a video for the pedal and detecting a location of the pedal;

determining the operation intensity of the pedal based on the location by determining the operation intensity that is mapped to the location using the database; and storing the operation intensity, wherein the constructing of the database comprises:

analyzing a video for the pedal when the pedal is not operated and detecting a first location of the pedal;

analyzing a video for the pedal when the pedal is fully operated and detecting a second location of the pedal;

defining the locations arranged at a predetermined interval from the first location to the second location;

defining the operation intensities by dividing an operation intensity range determined for the pedal by the number of locations; and mapping the locations and the operation intensities to each other, respectively, and storing the same in the database.

* * * * *